United States Patent
Fujita et al.

(10) Patent No.: US 9,280,720 B2
(45) Date of Patent: Mar. 8, 2016

(54) APPARATUS, METHOD, AND COMPUTER-READABLE STORAGE MEDIUM

(71) Applicant: CANON KABUSHIKI KAISHA, Tokyo (JP)

(72) Inventors: Takashi Fujita, Kawasaki (JP); Hiroyasu Kunieda, Yokohama (JP); Tetsuya Suwa, Yokohama (JP); Takashi Nakamura, Yokohama (JP); Kiyoshi Umeda, Kawasaki (JP); Yusuke Hashii, Tokyo (JP); Hiroyuki Sakai, Chigasaki (JP); Naoki Sumi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 14 days.

(21) Appl. No.: 13/934,007

(22) Filed: Jul. 2, 2013

(65) Prior Publication Data

US 2014/0010454 A1    Jan. 9, 2014

(30) Foreign Application Priority Data

Jul. 9, 2012    (JP) ................. 2012-154013

(51) Int. Cl.
*G06K 9/46* (2006.01)
*G06K 9/00* (2006.01)
*G06K 9/03* (2006.01)

(52) U.S. Cl.
CPC .............. *G06K 9/46* (2013.01); *G06K 9/00288* (2013.01); *G06K 9/00926* (2013.01); *G06K 9/036* (2013.01)

(58) Field of Classification Search
CPC . G06K 9/00221; G06K 9/00087; G06K 9/46; G06K 9/6255; G06T 7/0081
USPC .................. 382/190, 255, 266, 298, 118, 115
See application file for complete search history.

(56) References Cited

U.S. PATENT DOCUMENTS

| | | |
|---|---|---|
| 5,218,387 A | 6/1993 | Ueno |
| 5,881,214 A | 3/1999 | Morisawa |
| 6,885,760 B2 | 4/2005 | Yamada |
| 6,895,103 B2 | 5/2005 | Chen |
| 6,965,684 B2 | 11/2005 | Chen |

(Continued)

FOREIGN PATENT DOCUMENTS

| | | |
|---|---|---|
| JP | 5-197793 | 8/1993 |
| JP | 8-63597 | 3/1996 |

(Continued)

OTHER PUBLICATIONS

U.S. Appl. No. 13/934,001, filed Jul. 2, 2013.

(Continued)

*Primary Examiner* — Manuchehr Rahmjoo
(74) *Attorney, Agent, or Firm* — Fitzpatrick, Cella, Harper & Scinto

(57) ABSTRACT

A method includes a state determination step of determining the quality of an object in image data, an extraction step of extracting feature information from the object, and a registration step of registering, in a dictionary, the feature information extracted in the extraction step. In the registration step, when the quality of the object determined in the determination step is lower than a predetermined reference, registration of the feature information of the object in the dictionary by the registration step is not performed.

18 Claims, 34 Drawing Sheets

(56) References Cited

U.S. PATENT DOCUMENTS

| | | |
|---|---|---|
| 7,593,551 B2 | 9/2009 | Kamei |
| 7,699,423 B2 | 4/2010 | Suwa |
| 2003/0039380 A1 | 2/2003 | Sukegawa |
| 2005/0134907 A1* | 6/2005 | Obuchi et al. ............... 358/1.15 |
| 2005/0248655 A1* | 11/2005 | Kitamura et al. ............ 348/187 |
| 2007/0189585 A1 | 8/2007 | Sukegawa |
| 2010/0067027 A1 | 3/2010 | Kunieda |
| 2010/0232658 A1* | 9/2010 | Omoto et al. ............... 382/118 |
| 2010/0260415 A1 | 10/2010 | Sakai |
| 2010/0295998 A1 | 11/2010 | Sakai |
| 2012/0099762 A1 | 4/2012 | Kunieda |
| 2013/0100504 A1 | 4/2013 | Suwa |

FOREIGN PATENT DOCUMENTS

| | | |
|---|---|---|
| JP | 8-77334 | 3/1996 |
| JP | 2541688 | 7/1996 |
| JP | 11-53525 | 2/1999 |
| JP | 11-250267 | 9/1999 |
| JP | 2000-105829 | 4/2000 |
| JP | 2000-132688 | 5/2000 |
| JP | 2000-235648 | 8/2000 |
| JP | 2001-216515 | 8/2001 |
| JP | 2002-183731 | 6/2002 |
| JP | 2003-30667 | 1/2003 |
| JP | 2003-187229 | 7/2003 |
| JP | 3469031 | 9/2003 |
| JP | 2005-84824 | 3/2005 |
| JP | 2006-227699 | 8/2006 |
| JP | 2010-251999 | 4/2010 |
| JP | 2010-273144 | 12/2010 |

OTHER PUBLICATIONS

U.S. Appl. No. 13/932,686, filed Jul. 1, 2013.
U.S. Appl. No. 13/922,004, filed Jun. 19, 2013.

* cited by examiner

FIG. 10

| SENSING CLASSIFICATION | SENSING SUB-CLASSIFICATION | DATA TYPE | VALUE |
|---|---|---|---|
| BASIC IMAGE FEATURE AMOUNT | AVERAGE LUMINANCE | int | 0~255 |
| | AVERAGE SATURATION | int | 0~255 |
| | AVERAGE HUE | int | 0~359 |
| FACE DETECTION | NUMBER OF PERSON'S FACES | int | 0~MAXFACE |
| | COORDINATE POSITION | int * 8 | 0~Width or Height |
| | AVERAGE Y IN FACE REGION | int | 0~255 |
| | AVERAGE Cb IN FACE REGION | int | -128~127 |
| | AVERAGE Cr IN FACE REGION | int | -128~127 |
| SCENE ANALYSIS | SCENE RESULT | char | Landscape Nightscape Portrait Underexposure Others |

FIG. 11

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

F I G. 12

| CLASSIFICATION | CONTENTS | DATA TYPE | VALUE |
|---|---|---|---|
| IMAGE | FAVORITE RATE | int | 0~5 |
| | EVENT | char | "travel" "graduation" "wedding" |
| | | | |
| PERSON | NAME | char | "NAME" |
| | BIRTHDAY | char | YYYYMMDD |
| | FAMILY RELATIONSHIP | char | "family" "" |
| | | | |

ENTER INFORMATION OF FATHER
BIRTHDAY : 1970/1/1   FAMILY RELATIONSHIP : FATHER

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

F I G. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 24

| CATEGORY | CONTENTS | SCORE RANGE | DEGREE OF IMPORTANCE FOR EACH THEME (WEIGHT W) | | |
|---|---|---|---|---|---|
| | | | growth | travel | ... |
| INDIVIDUAL IMAGE EVALUATION | BRIGHTNESS APPROPRIATENESS | 0~100 | 0.5 | 1.0 | |
| | SATURATION APPROPRIATENESS | 0~100 | 0.5 | 1.0 | |
| IMAGE/SLOT MATCHING EVALUATION | PERSON MATCHING | 0~100 | 1.0 | 0.5 | |
| | TRIMMING LOSS DETERMINATION | 0~100 | 1.0 | 0.5 | |
| IN-PAGE BALANCE EVALUATION | IMAGE SIMILARITY | 0~100 | 0.5 | 1.0 | |
| | TONE VARIATION | 0~100 | 0.5 | 1.0 | |
| | FACE SIZE VARIATION | 0~100 | 0.5 | 1.0 | |
| OTHERS | USER TASTE | 0~100 | 0.8 | 0.8 | |

| IMAGE ID | CAPTURING DATE & TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

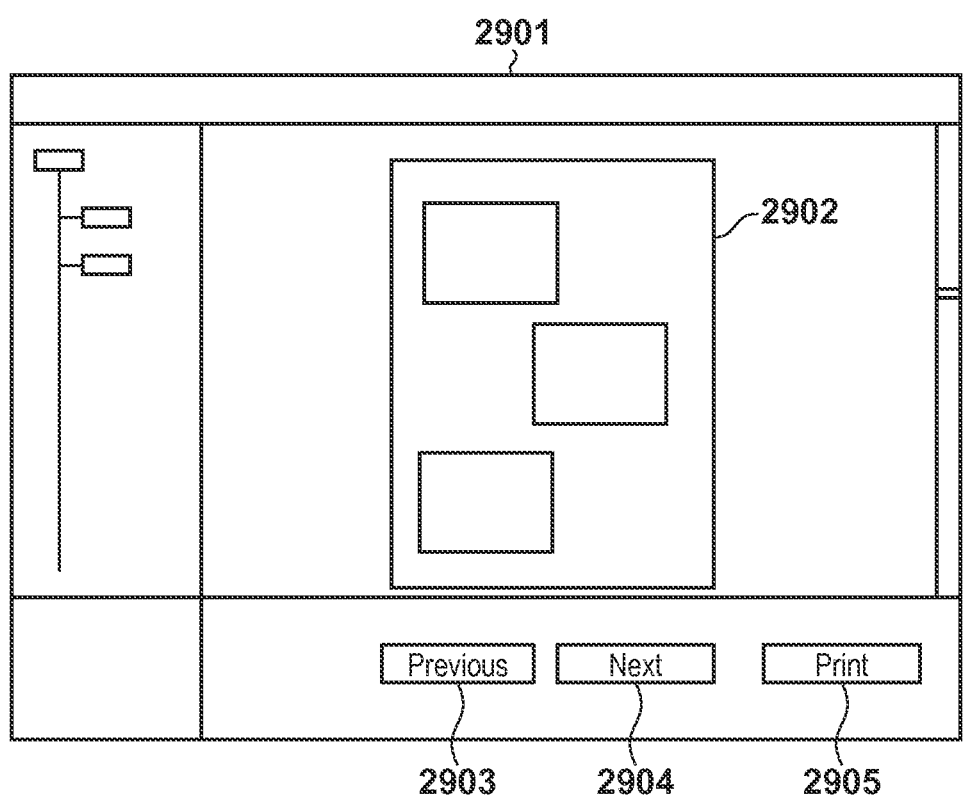

FIG. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

FIG. 31

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 32

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingRatio>50.0</TrimingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingRatio>38.0</TrimingRatio>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingRatio>53.0</TrimingRatio>
        </ImageSlot>

.......

</LayoutInfo>
```

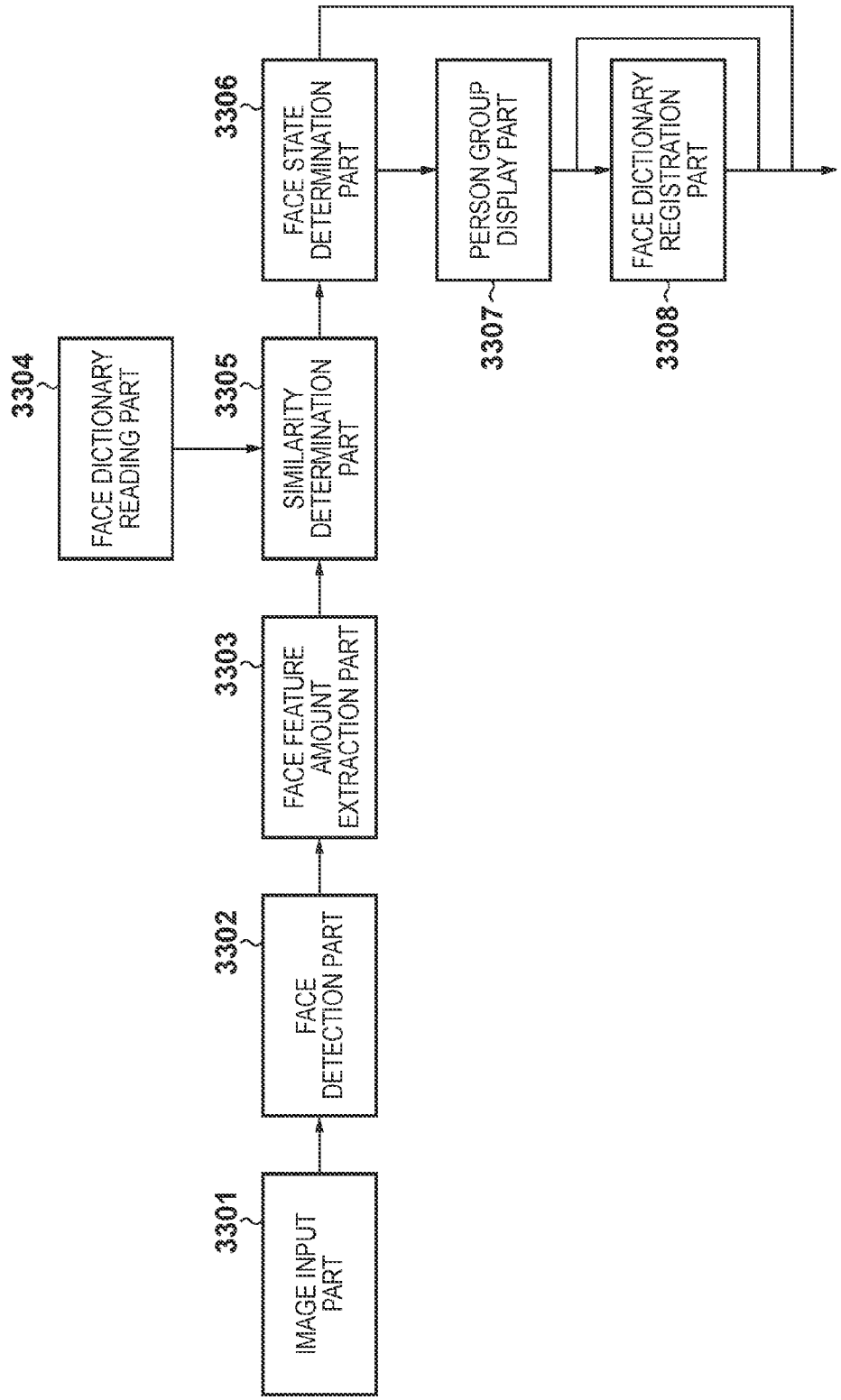

F I G. 34

| ID | CLASSIFICATION | FACE FEATURE AMOUNT GROUP | | | |
|---|---|---|---|---|---|
| 1 | 1 | ▨ | ▨ | ▨ | |
| 1 | 2 | ▨ | ▨ | ▨ | ▨ ~3403 |
| 1 | 3 | ▨ | | | |
| 1 | 4 | ▨ | ▨ | | |
| 2 | 1 | ▨ | ▨ | | |
| 2 | 2 | ▨ | ▨ | ▨ | |
| 3 | 1 | ▨ | | | |

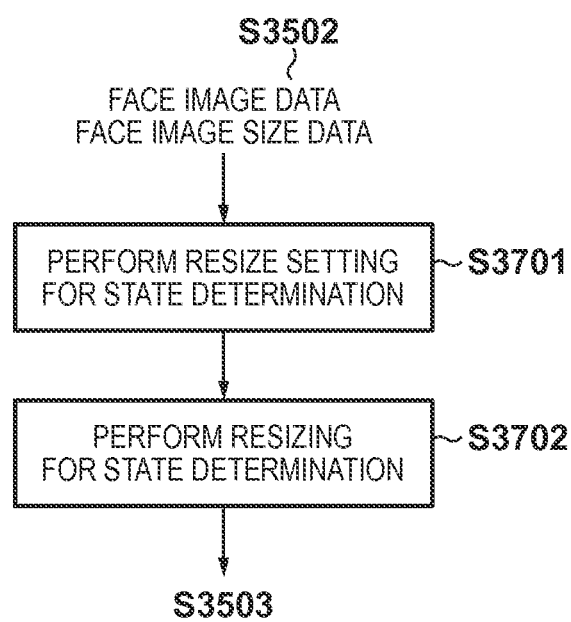
F I G. 37

APPARATUS, METHOD, AND COMPUTER-READABLE STORAGE MEDIUM

BACKGROUND OF THE INVENTION

1. Field of the Invention

The present invention relates to an image processing technique of detecting and managing an object in image data.

2. Description of the Related Art

As digital still cameras (to be also referred to as "DSCs" hereinafter) become popular, image data as many as several thousands or several ten thousands need to be handled nowadays. As one especially important technique for the handling method, personal recognition is implemented by handling images based on a human's face. For example, a face region included in an input image is detected in advance, information (to be referred to as a "feature amount" hereinafter) obtained by analyzing the detected face image is extracted, and the extracted feature amount is registered. Note that the feature amount to be registered increases in accordance with the number of images to be analyzed and the number of faces included in an image. A database in which feature amounts are registered will be called a "dictionary" or "face dictionary". Personal recognition becomes possible by matching between an obtained face dictionary and a feature amount obtained by analyzing a newly input image.

In Japanese Patent Laid-Open No. 2005-084824, to increase the matching accuracy, a poor-quality portion in face image data is corrected and then undergoes matching processing with face image data registered in a dictionary. In this dictionary, various dictionary patterns assuming that part of face image data is a poor image are registered in advance. Determination of poor image quality uses an average luminance value in each block image.

However, the method disclosed in Japanese Patent Laid-Open No. 2005-084824 decreases the personal recognition accuracy and matching accuracy of the face dictionary depending on the registration contents of the face dictionary.

SUMMARY OF THE INVENTION

The present invention provides an image processing apparatus and image processing method capable of high-accuracy recognition processing, and a computer-readable storage medium.

To achieve the above object, an image processing apparatus according to the present invention comprises the following arrangement.

That is, an apparatus comprising: a determination unit configured to determine quality of an object in image data; an extraction unit configured to extract feature information of the object; and a registration unit configured to register, in a dictionary, the feature information extracted by the extraction unit, wherein when the quality of the object determined by the determination unit is lower than a predetermined reference, the registration unit does not register the feature information in the dictionary.

According to the present invention, a dictionary capable of high-accuracy recognition processing can be created. Hence, the present invention can implement an image processing apparatus and image processing method capable of high-accuracy recognition processing, and a program.

Further features of the present invention will become apparent from the following description of exemplary embodiments (with reference to the attached drawings).

BRIEF DESCRIPTION OF THE DRAWINGS

FIG. 10 is a table showing an example of attribute information obtained by image analysis;

FIG. 11 is a view showing an example of an image analysis result save format;

FIG. 12 is a table showing an example of attribute information that can be manually input by a user;

FIG. 18 is a view showing an example of the hold format of the layout template shown in FIG. 17;

FIG. 20 is a view showing an example of the hold format of the layout template shown in FIG. 19;

FIG. 24 is a table showing an example of layout evaluation values when performing automatic layout;

FIG. 29 is a view showing a display example of an automatic layout generation result;

FIG. 30 is a view showing an example of holding a decided theme and main character information;

FIG. 31 is a view showing an example of holding a decided theme and main character information;

FIG. 32 is a view showing an example of holding generated automatic layout information;

FIG. 33 is a block diagram for explaining a face dictionary creation apparatus;

FIG. 34 is a view for explaining the internal arrangement of a face dictionary;

FIG. 37 is a flowchart for explaining face state determination processing;

DESCRIPTION OF THE EMBODIMENTS

Embodiments of the present invention will now be described in detail with reference to the accompanying drawings.

(First Embodiment)

The first embodiment of the present invention will be described to automatically generate a layout output by using an input image group. This merely exemplifies a form of implementation, and the present invention is not limited to the following embodiment.

Figure 1:
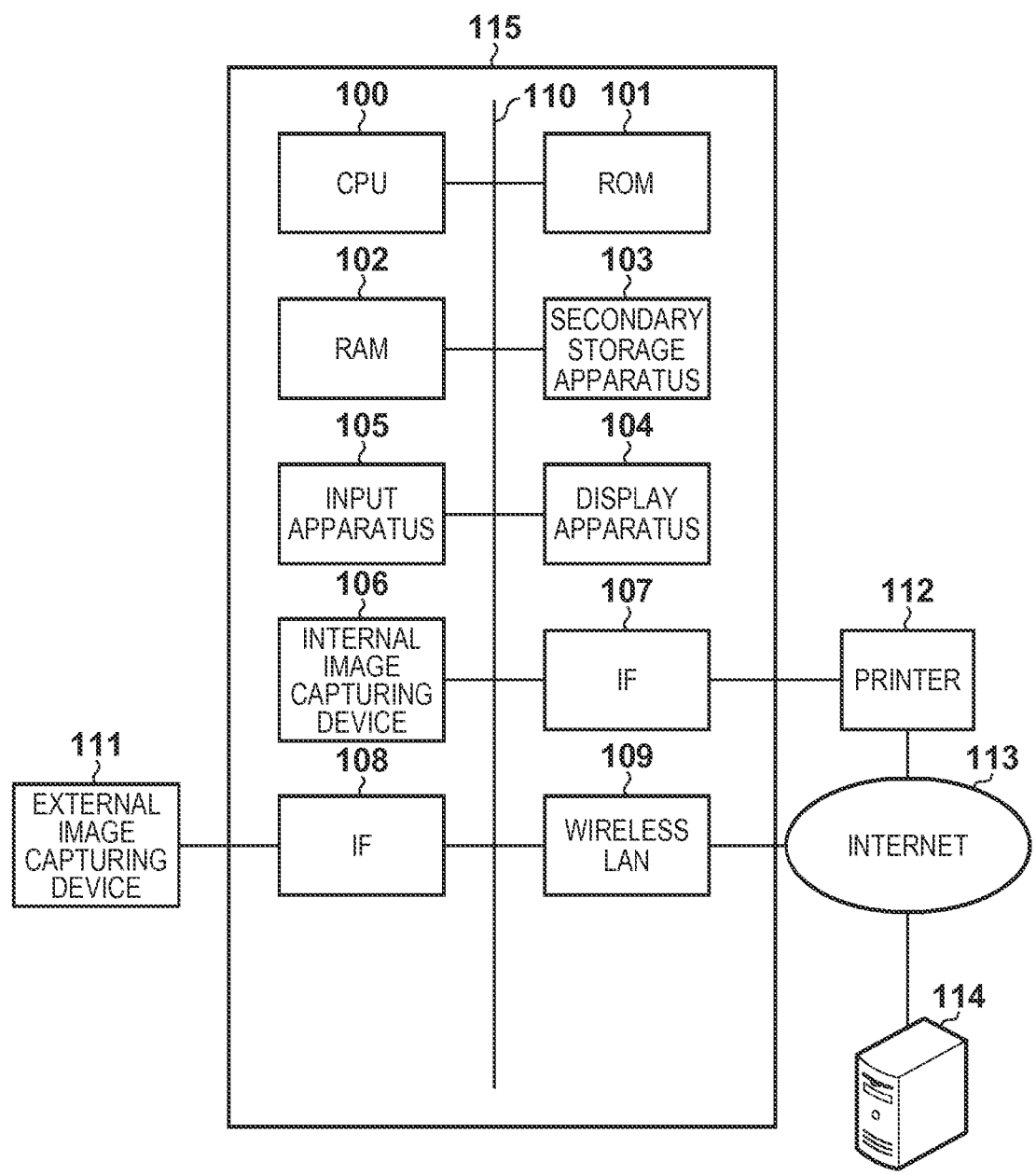
FIG. 1 is a block diagram showing the hardware arrangement of an image processing apparatus.

FIG. 1 is a block diagram showing an example of the hardware arrangement of an image processing apparatus according to the first embodiment.

In FIG. 1, an image processing apparatus 115 includes a CPU (Central Processing Unit) 100, ROM 101, RAM 102, secondary storage apparatus 103, display apparatus 104, input apparatus 105, IF 107, IF 108, and wireless LAN (Local Area Network) 109. Further, the image processing apparatus 115 includes an internal image capturing device 106. These units are connected to each other by a control bus/data bus 110. The image processing apparatus 115 according to the embodiment is implemented by an information processing apparatus.

The image processing apparatus 115 is, for example, a computer 115. The CPU 100 executes information processing to be described in the first embodiment in accordance with programs such as an application. The CUP 101 loads a program stored in a hard disk or the like to a RAM 102 and runs the program on the RAM 102, thereby controlling of the entire image arrangement control apparatus according to the present embodiment. The ROM 101 stores programs to be executed by the CPU 100. The RAM 102 provides a memory to temporarily store various kinds of information when the CPU 100 executes the programs. The secondary storage apparatus 103 is a hard disk or the like and serves as a storage medium to save, for example, a database that saves image files and image analysis results. The display apparatus 104 is, for example, a display and is an apparatus which presents, to the user, various kinds of UIs (User Interfaces) to be described below, including a processing result in the embodiment. The display apparatus 104 may have a touch panel function. The control bus/data bus 110 connects the above-described units to the CPU 100. The image processing apparatus 115 also includes the input apparatus 105 such as a mouse or keyboard used by a user to input an image correction processing instruction and the like.

The image processing apparatus 115 may include the internal image capturing device 106. An image captured by the internal image capturing device 106 undergoes predetermined image processing and is saved in the secondary storage apparatus 103. The image processing apparatus 115 may load an image from an external image capturing device 111 connected via an interface (IF 108). The image processing apparatus 115 also includes the wireless LAN 109, which is connected to Internet 113. The image processing apparatus 115 can also acquire image data from an external server 114 connected to the Internet 113.

A printer 112 for outputting an image and the like is connected to the image processing apparatus 115 via the IF 107. The printer 112 is further connected to the Internet and can exchange print data via the wireless LAN 109.

Figure 2:
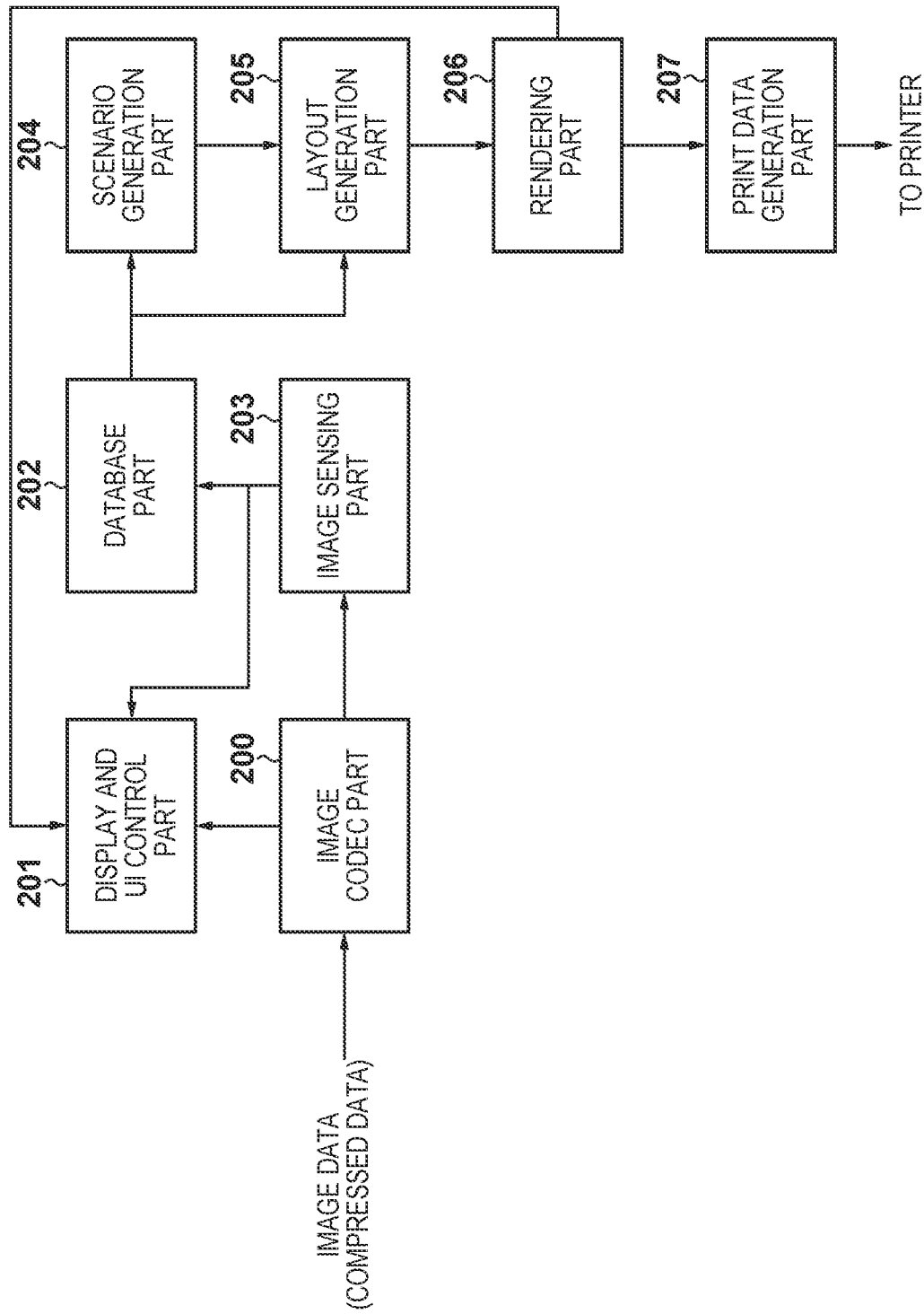
FIG. 2 is a block diagram showing software for controlling the image processing apparatus.

FIG. 2 is a block diagram showing a software arrangement including the above-described application according to the first embodiment.

Image data acquired by the image processing apparatus 115 is normally compressed in a compression format such as JPEG (Joint Photography Expert Group). Hence, an image codec part 200 decompresses image data based on the compression format and converts it into image data (bitmap data) in a so-called RGB dot-sequential bitmap data format. The converted bitmap data is transferred to a display and UI control part 201 and displayed on the display apparatus 104 such as a display.

The bitmap data is further input to an image sensing part 203 (application), and undergoes various analysis processes (details will be described later) by the image sensing part 203. Various kinds of attribute information of the image obtained by the analysis processing are stored in the secondary storage apparatus 103 by a database part 202 (application) in accordance with a predetermined format. Note that image analysis processing and sensing processing will be handled in the same sense.

A scenario generation part 204 (application) generates the conditions of a layout to be automatically generated in accordance with various conditions input by the user, details of which will be described later. A layout generation part 205 performs processing of automatically generating a layout for arranging image data in accordance with the generated scenario.

A rendering part 206 renders the generated layout into bitmap data for display. The bitmap data serving as the rendering result is transmitted to the display and UI control part 201, and its contents are displayed on the display apparatus 104. The rendering result is also transmitted to a print data generation part 207, and the print data generation part 207 converts it into printer command data and transmits the command to the printer 112.

The flowchart of basic image processing according to the embodiment will be described with reference to FIGS. 3 to 6.

Figure 3:
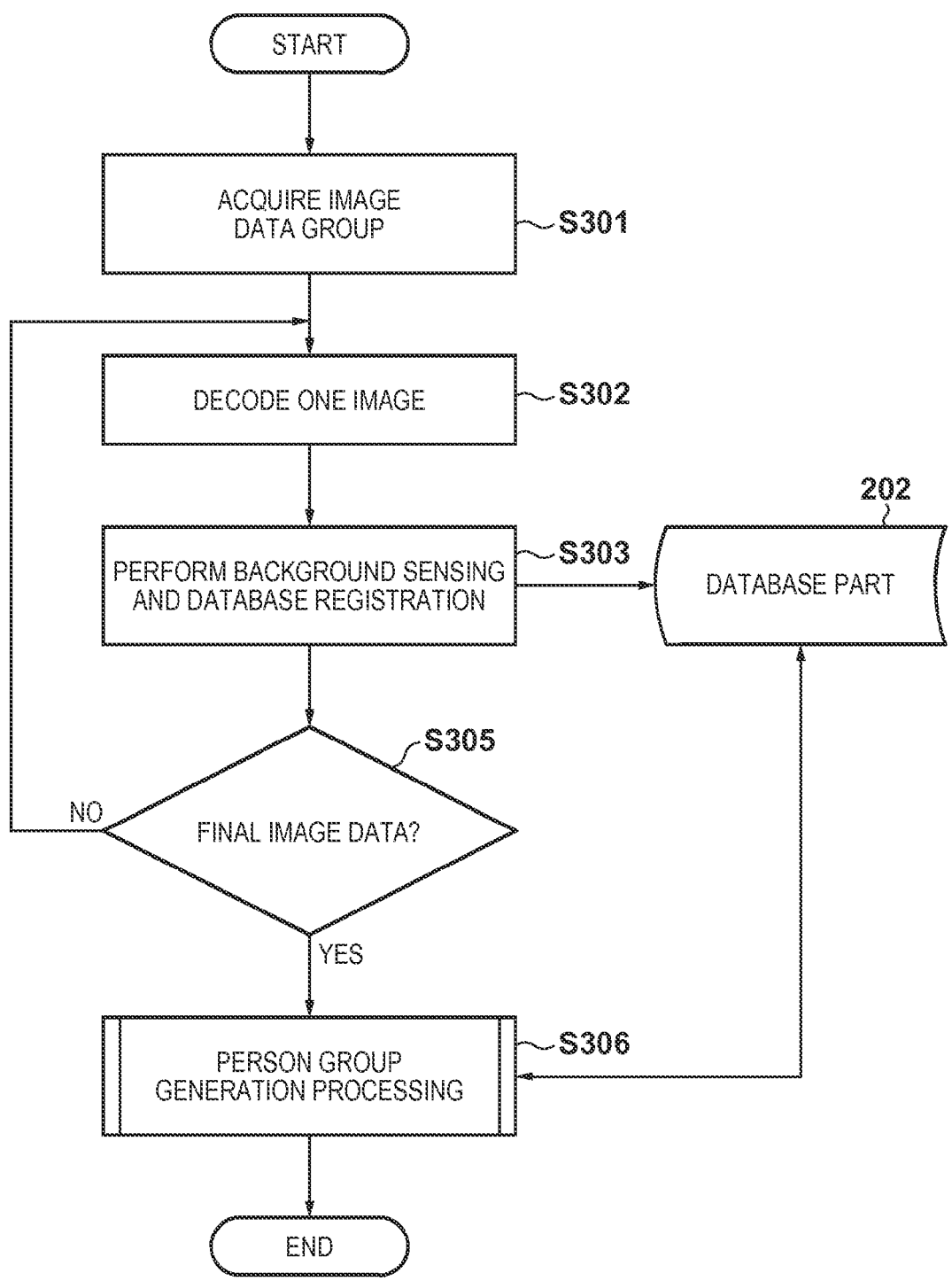
FIG. 3 is a flowchart of image analysis processing.
Figure 4:
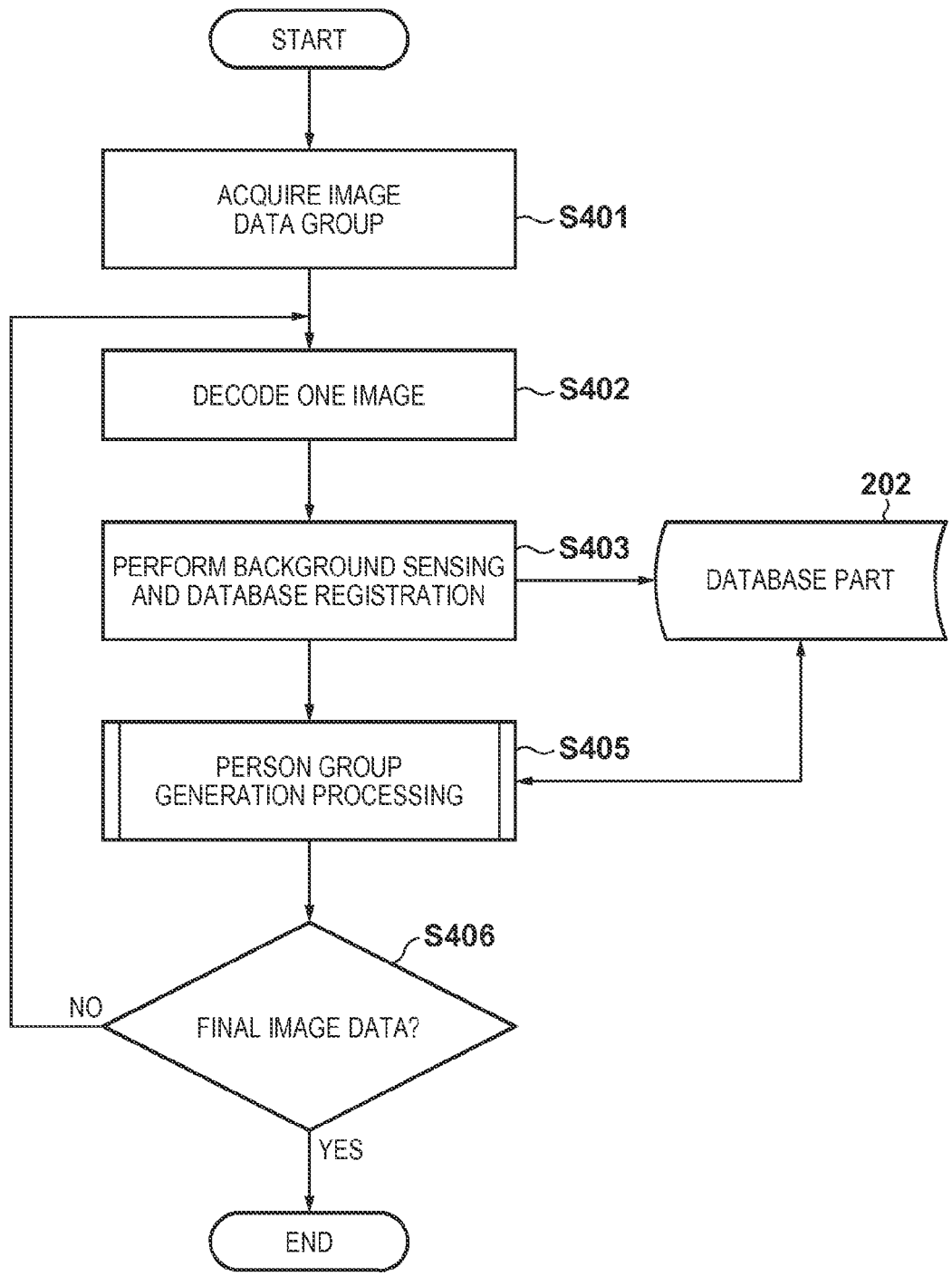
FIG. 4 is a flowchart of image analysis processing.

FIGS. 3 and 4 are flowcharts each showing processing to be executed by the image sensing part 203. FIGS. 3 and 4 each show processing of acquiring a plurality of image data groups, performing analysis processing for each image data group, and storing the result in the database part 202.

Figure 5:
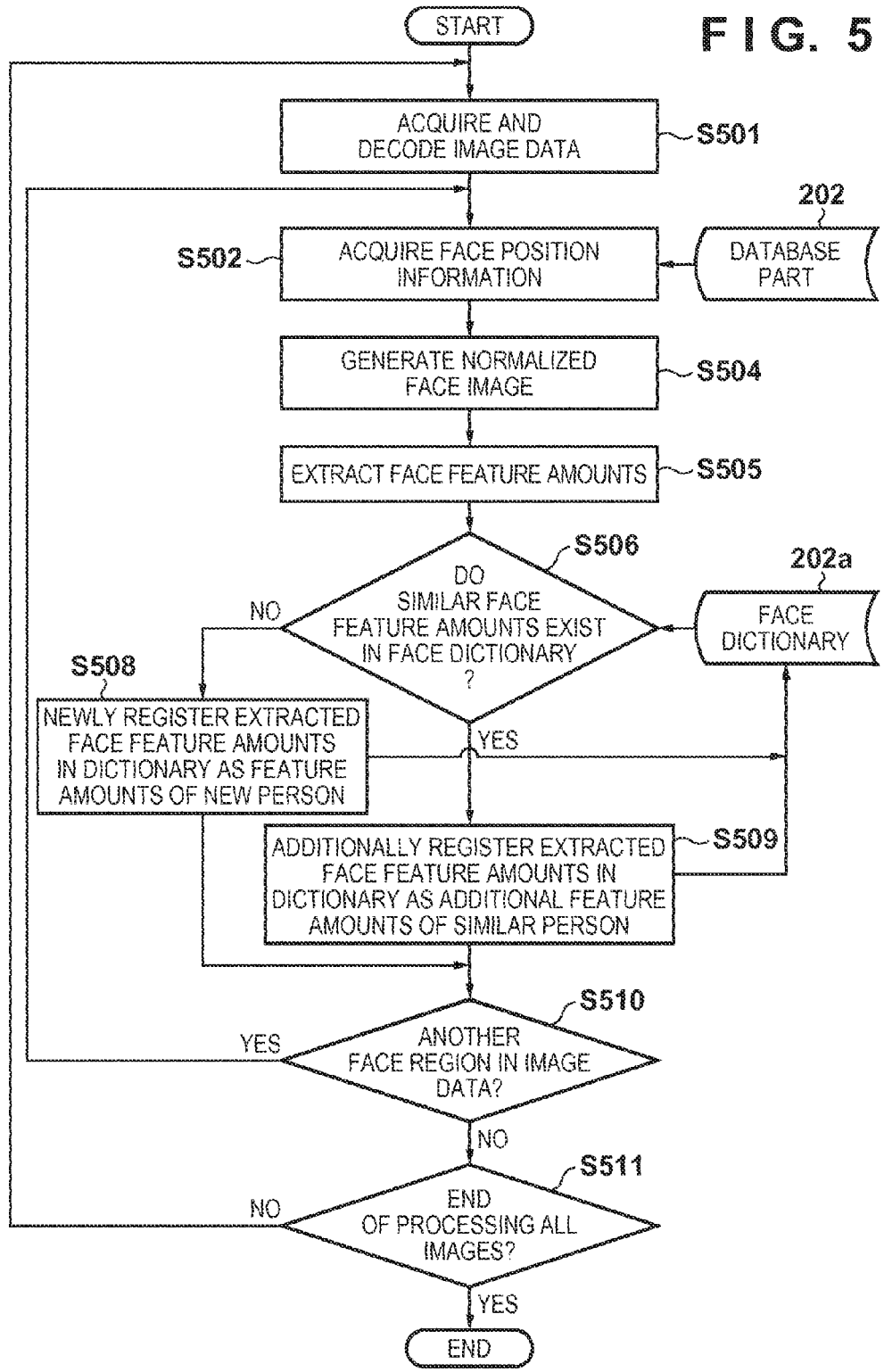
FIG. 5 is a flowchart of person group generation processing.

FIG. 5 shows person group generation processing of grouping face information supposed to be of the same person based on detected face position information.

Figure 6:
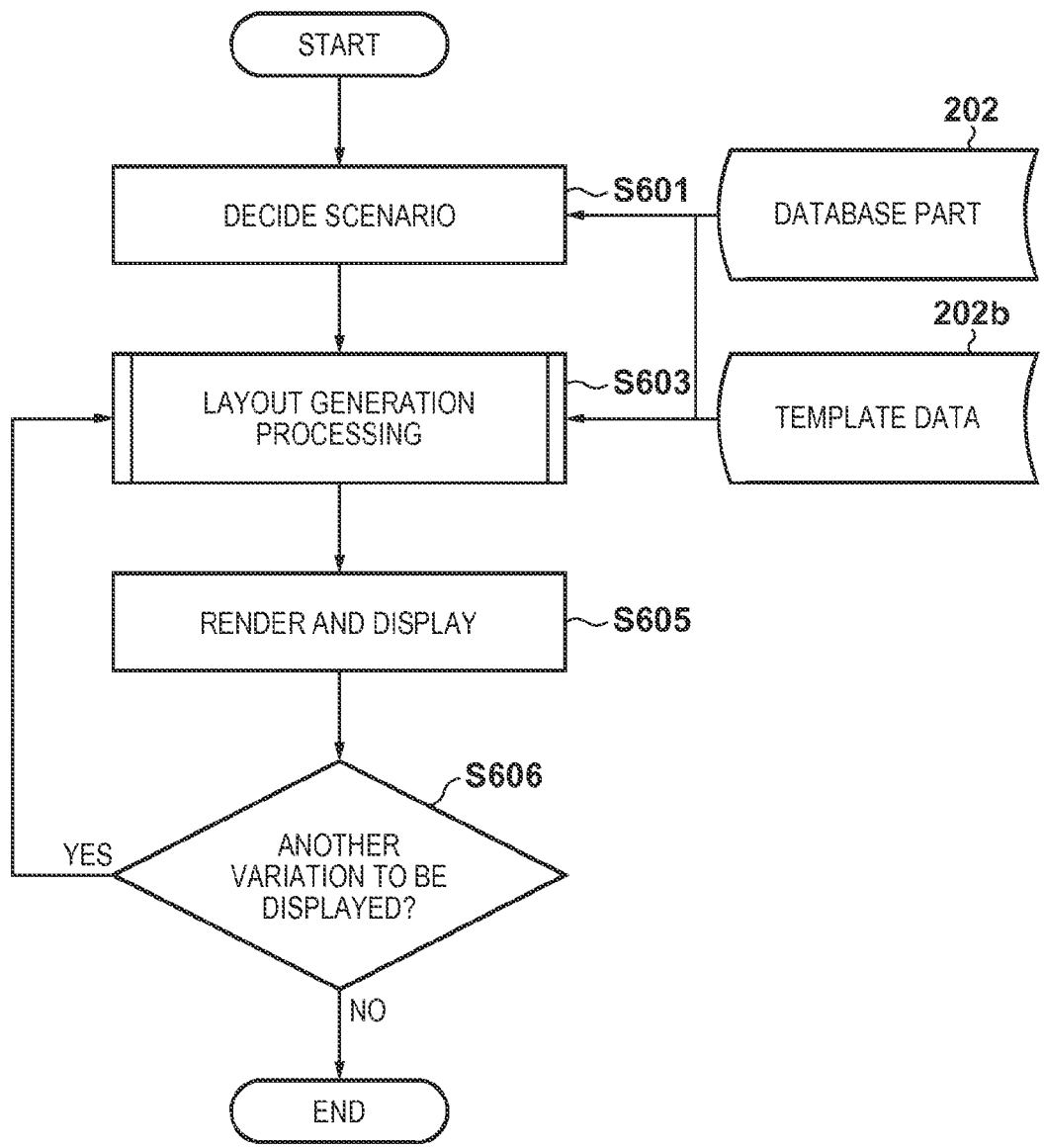
FIG. 6 is a flowchart of automatic layout proposal processing.

FIG. 6 shows processing of deciding a scenario for layout creation based on image analysis information and various kinds of information input by the user, and automatically generating a layout based on the scenario.

First, the flowchart of processing to be executed by the image sensing part 203 will be explained with reference to FIG. 3.

In step S301, the image sensing part 203 acquires an image data group. For example, the user connects, to the image processing apparatus 115, an image capturing apparatus or memory card which stores captured images, and loads the captured images from it, thereby acquiring an image data group. As the image data group, images which have been captured by the internal image capturing device 106 and stored in the secondary storage apparatus 103 may be acquired. The image data group may be acquired via the wireless LAN 109 from an apparatus other than the image processing apparatus 115, such as the external server 114 connected to the Internet 113.

Figure 8:
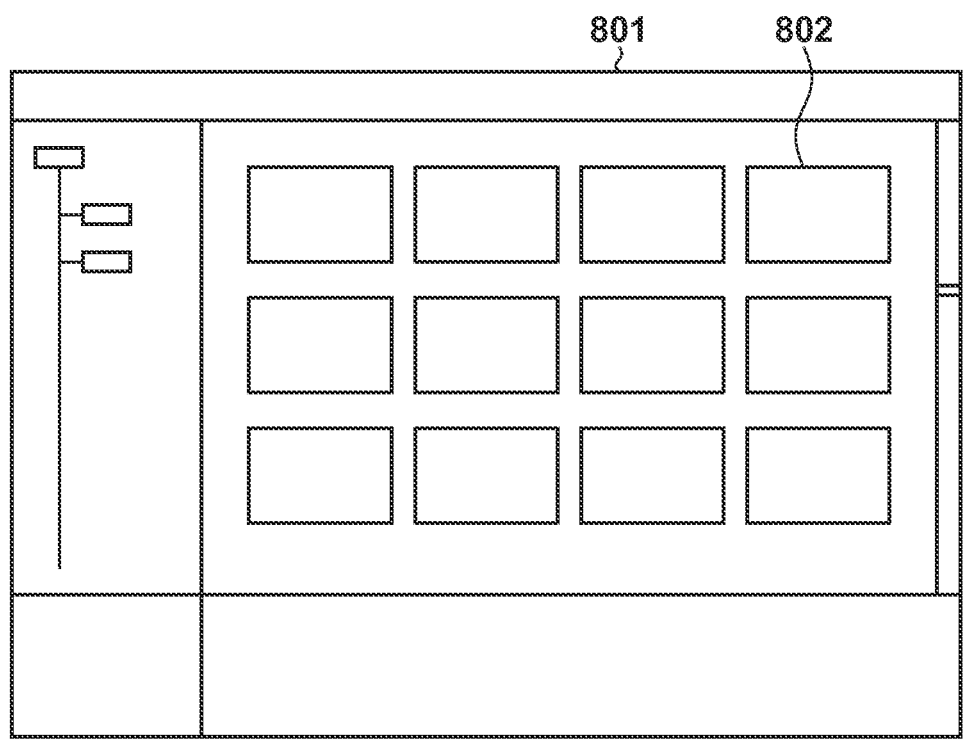
FIG. 8 is a view showing a display example of an image group in a thumbnail format.
Figure 9:
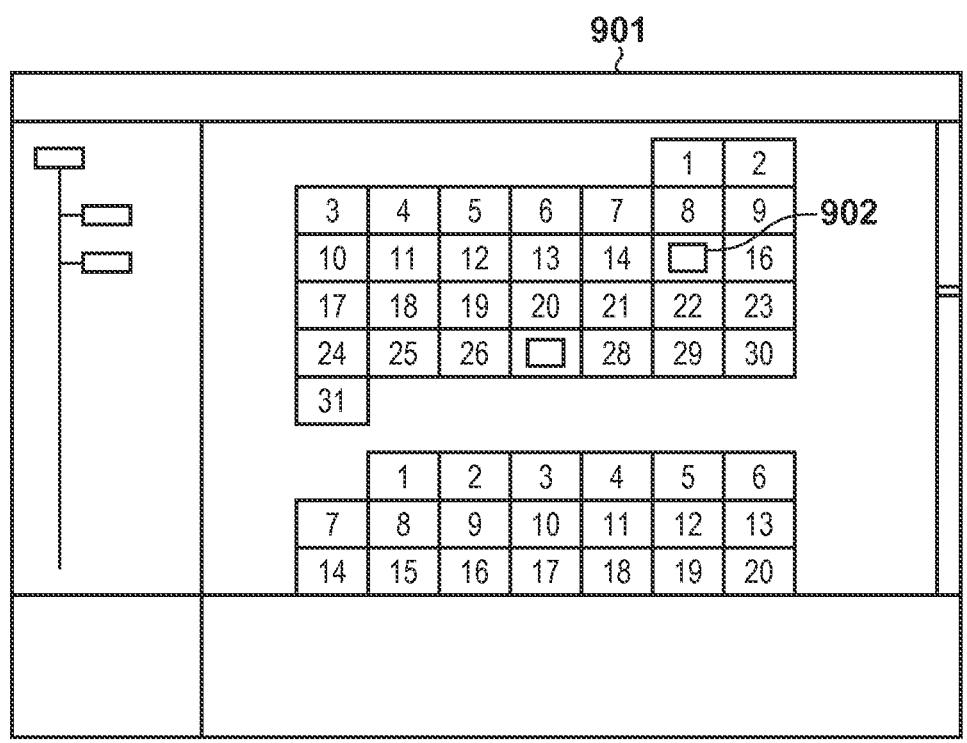
FIG. 9 is a view showing a display example of an image group in a calendar format.

A display on the display apparatus 104 upon acquiring an image data group will be explained with reference to FIGS. 8 and 9. When an image data group is acquired, the UI on the display apparatus 104 changes to a display which allows the user to confirm images based on the acquired image data, as shown in FIGS. 8 and 9. The UI display method on the display apparatus 104 is not particularly limited as long as an image can be confirmed. For example, thumbnails 802 of images may be displayed on a UI 801 for each folder in the secondary storage apparatus 103, as shown in FIG. 8. Alternatively, image data may be managed for each date of a calendar on a UI 901, as shown in FIG. 9. When the user clicks a date portion 902 on the UI 901 of FIG. 9, images captured at the clicked date are displayed in a thumbnail list as shown in FIG. 8.

In steps S302 to S305, analysis processing and database registration of the analysis result are performed for each acquired image data group.

More specifically, in step S302, the image sensing part 203 decodes each image. The image sensing part 203 (application) searches for image data which has newly been saved and has not undergone image sensing processing yet. The image codec part 200 converts (decodes) each extracted image from image data (compressed image data) into bitmap data.

In step S303, the image sensing part 203 executes various sensing processes for the bitmap data to acquire sensing information, and registers the sensing information in a database. The sensing processing here indicates image analysis processing. In the embodiment, various image analysis processes shown in FIG. 10 are performed. More specifically, object face detection in image data, feature amount analysis of a face region, image feature amount analysis, and scene analysis are performed as the sensing processing, and results of data types as shown in FIG. 10 are calculated. In the embodiment, average luminance (int: value 0 to 255), average saturation (int: 0 to 255), and average hue (int: 0 to 359) are analyzed as basic image feature amounts. As face detection, the number of person's faces (int: value 0 or more (0 to MAXFACE)) and coordinate positions (int*8: value 0 or more (same for Width and Height)) representing position information of a person's face are analyzed. Further, the average Y (int: value 0 to 255) in a face region, the average Cb (int: value −128 to 127) in the face region, and the average Cr (int: value −128 to 127) in the face region are analyzed.

Note that an object's face is a person's face in the embodiment, but the object may be the face of an animal such as a pet.

Each sensing processing will be explained below.

The average luminance and average saturation of an entire image, which are basic feature information of an image such as image feature amounts, can be calculated by a known method and will therefore be described briefly. For the average luminance, the R, G, and B components of each pixel of an image are converted into known luminance and color difference components (for example, Y, Cb, and Cr components), and the average value of the Y components is calculated. For the average saturation, the Cb and Cr components are calculated for each pixel, and the average value S is obtained by solving equation (1):

$$S = \sqrt{Cb^2 + Cr^2} \quad (1)$$

The average hue AveH in an image is a feature amount to evaluate the tone of the image. The hue of each pixel can be obtained using a known HIS transformation. The values are averaged in the entire image, thereby obtaining AveH.

The feature amounts may be calculated for an entire image. Alternatively, for example, an image may be divided into regions having a predetermined size, and the feature amounts may be calculated for each region.

Person's face detection processing will be described next. Various methods are usable as the person's face detection method according to the embodiment. In a method disclosed in Japanese Patent Laid-Open No. 2002-183731, first, an eye region is detected from an input image, and a region around the eye region is set as a face candidate region. The luminance gradient and the weight of the luminance gradient are calculated for the face candidate region. These values are compared with the gradient and gradient weight of a preset ideal reference face image. At this time, when the average angle between the gradients is equal to or smaller than a predetermined threshold, the input image is determined to have a face region.

In a method described in Japanese Patent Laid-Open No. 2003-30667, a flesh color region is detected from an image. A human iris color pixel is then detected in the flesh color region, thereby detecting the position of an eye.

In a method described in Japanese Patent Laid-Open No. 8-63597, the matching level between an image and each of a plurality of face shape templates is calculated. A template having a highest matching level is selected. If the highest matching level is equal to or more than a predetermined threshold, a region on the selected template is set as a face candidate region. By using this template, the position of an eye can be detected.

In a method described in Japanese Patent Laid-Open No. 2000-105829, a nose image pattern is set as a template, and an entire image or a designated region of an image is scanned. A position that matches the template most is output as the position of the nose. Then, a region above the nose position in the image is assumed to be a region where the eyes exist. The eye existence region is scanned using an eye image pattern as a template, and matching is calculated. A set of pixels whose matching levels are higher than a given threshold is acquired as an eye existence candidate position. A continuous region included in the eye existence candidate position set is divided into clusters. The distance between each cluster and the nose position is calculated. A cluster having a shortest distance is decided as a cluster including an eye, thereby detecting the organ position.

As other face detection processing methods, known methods of detecting a face and organ positions are usable, including methods described in Japanese Patent Laid-Open Nos. 8-77334, 2001-216515, 5-197793, 11-53525, 2000-132688, 2000-235648, and 11-250267, and Japanese Patent No. 2541688.

As a result of the face detection processing, the number of person's faces and the coordinate positions of each face can be acquired. Once face coordinate positions in an image are known, the average luminance and average color differences of the face region can be obtained by calculating, for each face region, the average Y, Cb, and Cr values of pixel values included in the face region.

Scene analysis processing can be performed using the feature amount of an image. The scene analysis processing can use various methods. For example, known methods as disclosed in Japanese Patent Laid-Open Nos. 2010-251999 and 2010-273144 filed by the present applicant are usable. As a result of the scene analysis processing, IDs for discriminating capturing scenes such as Landscape, Nightscape, Portrait, Underexposure, and Others can be acquired.

Note that the sensing information is not limited to that acquired by the above-described sensing processing, and any other sensing information may be used.

The image sensing part 203 stores, in the database part 202, the sensing information acquired in the above-described manner.

The save format in the database part 202 is not particularly limited. The sensing information is described using, for example, a general-purpose format (for example, XML: eXtensible Markup Language) as shown in FIG. 11 and stored.

FIG. 11 shows an example in which pieces of attribute information of each image are classified into three categories and described. The first <BaseInfo> tag is information added to an acquired image file in advance and representing the image size and capturing time information. This tag includes the identifier ID (ID) of each image, the save location (<ImagePath>) where the image file is stored, the image size (<ImageSize . . . >), and the capturing date & time (<CaptureDateTime>).

The second <SensInfo> tag is used to store the result of the above-described image analysis processing. The average luminance, average saturation, and average hue of an entire image and the scene analysis result are stored. In addition, information associated with the face position and face color of a person present in the image can be described.

The third <UserInfo> tag can store information input by the user for each image, details of which will be described later.

Note that the method of storing attribute information of an image in the database part 202 is not limited to the above-described one, and any other known format is usable.

In step S305, the image sensing part 203 determines whether unprocessed image data in the acquired image data group is the final image data. If the unprocessed image data is not the final image data (NO in step S305), the process returns to step S302, and the image sensing part 203 acquires the unprocessed image data from the acquired image data group. If the unprocessed image data is the final image data (YES in step S305), the process advances to step S306.

In step S306, the image sensing part 203 performs person grouping by using personal recognition processing. In this case, person group generation processing is generated to generate a group of each person by using the face position information detected in step S303. Automatically grouping person's faces in advance makes work efficient to name each person later by the user.

The person group generation processing is executed using a personal recognition technique according to the flowchart of FIG. 5.

Note that the personal recognition technique is mainly formed from two techniques, that is, extracting the feature amounts of organs such as an eye and mouth existing in a face and comparing the similarities of the relationships between them. As the personal recognition technique, a known method is usable, as disclosed in Japanese Patent No. 3469031.

FIG. 5 is a flowchart showing details of step S306.

In step S501, the image sensing part 203 sequentially reads out and decodes image data stored in the secondary storage apparatus 103. The decoding processing is the same as step S302, and a description thereof will not be repeated.

In step S502, the image sensing part 203 accesses the database part 202 to acquire the number of faces included in the image data and face position information.

In step S504, the image sensing part 203 generates a normalized face image to perform personal recognition processing.

The normalized face images are face images obtained by extracting faces existing in images with various sizes, orientations, and resolutions, and converting and cutting out them into faces having a predetermined size and orientation. Since the positions of organs such as an eye and mouth are important to perform personal recognition, the normalized face image has a size enough to reliably recognize the organs. By preparing the normalized face images, feature amount extraction processing need not cope with faces of various resolutions.

In step S505, the image sensing part 203 extracts a face feature information such as face feature amounts from the normalized face image. The face feature amounts include the positions and sizes of organs such as an eye, mouth, and nose, and the outline of the face.

Figure 35:
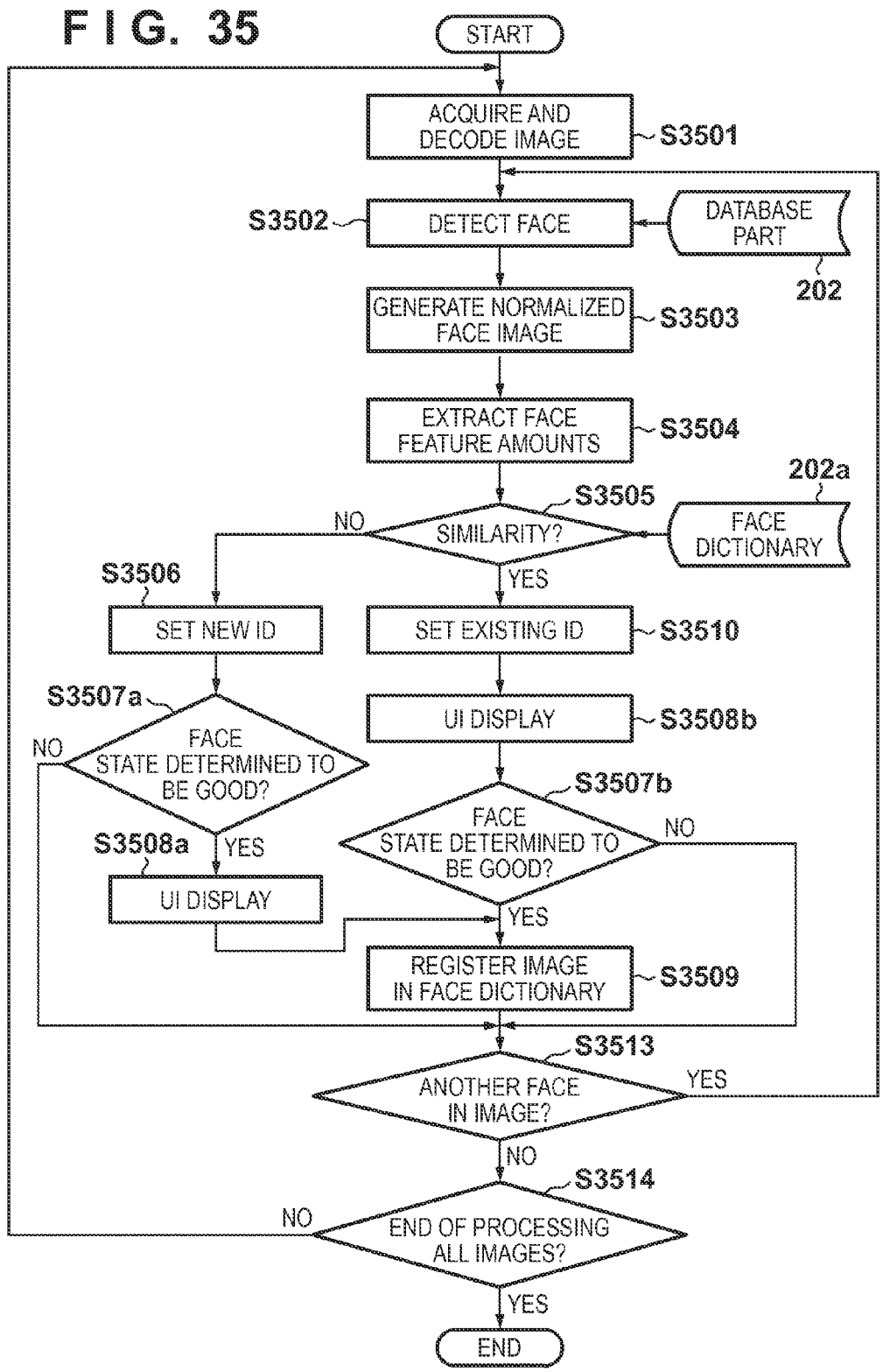
FIG. 35 is a flowchart showing face dictionary creation.

In step S506, the image sensing part 203 refers to a face dictionary which is built in the database part 202 and stores face feature amounts prepared in advance for each person identifier (person ID), and determines whether face feature amounts stored in the face dictionary are similar to the extracted face feature amounts. Although all face feature amounts are registered in the above description, face feature amounts are not registered in some cases, as shown in FIGS. 33 and 35, details of which will be described later.

If the image sensing part 203 determines that the stored face feature amounts are similar to the extracted ones (YES in step S506), it additionally registers the extracted feature amounts as additional feature amounts of the same (or similar) person in the entry of the corresponding person ID in step S509.

If the image sensing part 203 determines that the stored face feature amounts are not similar to the extracted ones (NO in step S506), the feature amounts of the currently evaluated face are considered to be of a person different from those registered in the face dictionary until now in step S508. Thus, the image sensing part 203 issues a new person ID, and newly registers the feature amounts in the face dictionary. In the embodiment, the feature amounts of a face determined to be in a poor face state in face state determination are not registered in the dictionary.

In step S510, the image sensing part 203 determines whether there is another face region in the processing target image data. If there is another face region (YES in step S510), the process returns to step S502. If there is no other face region (NO in step S510), the process advances to step S511.

In step S511, the image sensing part 203 determines whether the processes in steps S502 to S509 have ended for all images. If the processes have ended for all images, the process ends. If the processes have not ended for all images, the process returns to step S502. That is, the image sensing part 203 applies the processes in steps S502 to S509 to all face regions detected from the acquired image data group, and groups appearing persons.

Figures 15, 16:
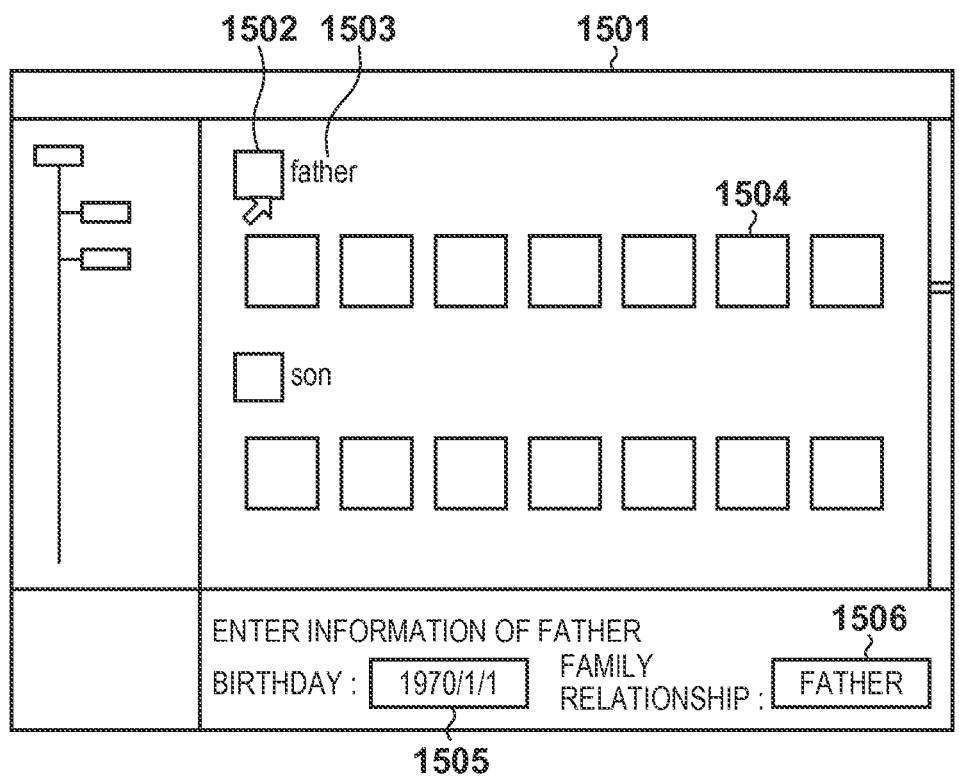
FIG. 15 is a view showing an example of a UI used to manually input person attribute information.
FIG. 16 is a view showing an example of a person attribute information save format.

The grouping result is described using an ID tag for each face region, as represented by the XML format of FIG. 16, and saved in the database part 202 (FIG. 3).

In the first embodiment, person group generation processing is executed after the end of sensing processing and database registration of all image data, as shown in FIG. 3. However, another method may be adopted. For example, as shown in FIG. 4, after each image data undergoes sensing processing and is registered in the database in step S403, person group generation processing is executed in step S405 using face position information. All image data are processed by repeating these processes.

Each person group obtained by the above-described processing is displayed on the UI of the display apparatus 104.

Figure 7:
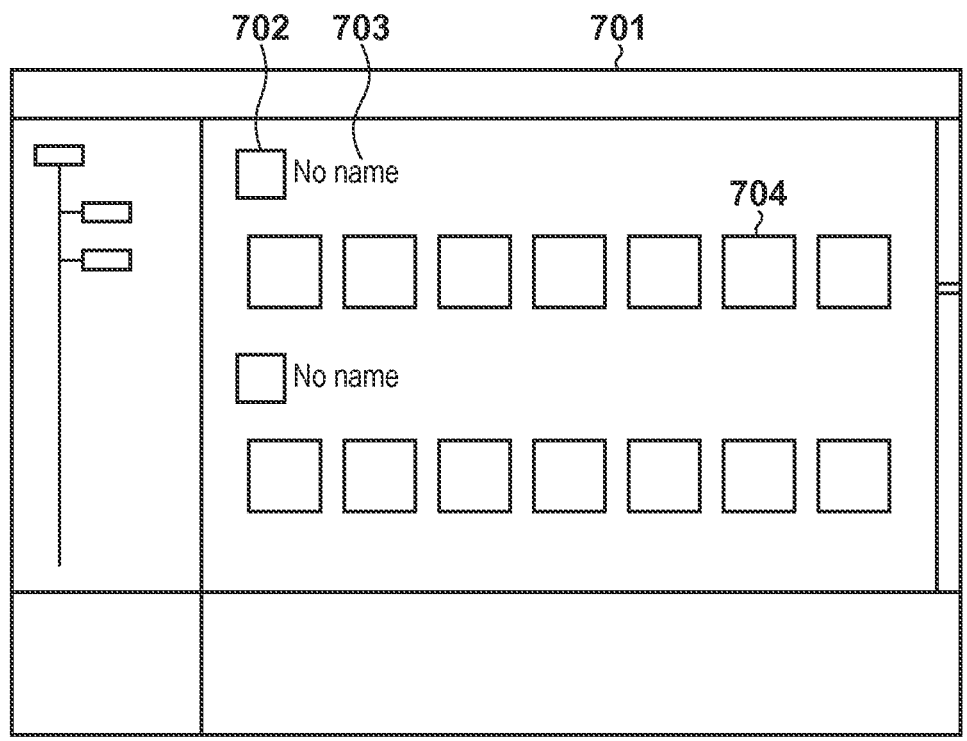
FIG. 7 is a view showing a display example of person groups.

FIG. 7 shows display of each person group according to the embodiment. On a UI 701 of FIG. 7, reference numeral 702 denotes a representative face image of the person group. Beside the representative face image 702, a region 703 exists and displays the name of the person group. Immediately after the end of automatic person grouping processing, a person name "No name" is displayed in the region 703, as shown in FIG. 7. In 704, a plurality of face images included in the person group are displayed. In the UI 701 of FIG. 7, a person name can be input by designating the "No name" region 703, or information such as the birthday or family relationship can be input for each person, as will be described later.

The above-described sensing processing may be executed using the background task of the operating system. In this case, even if the user is performing another work in the computer 115, he can continue sensing processing for an image group.

In the embodiment, various kinds of attribute information about an image may be set manually by the user or automatically.

FIG. 12 shows a list of examples of the attribute information. The manually or automatically registered attribute information is roughly divided into image attribute information set for each image and person attribute information set for each person grouped by person grouping processing.

Figure 13:
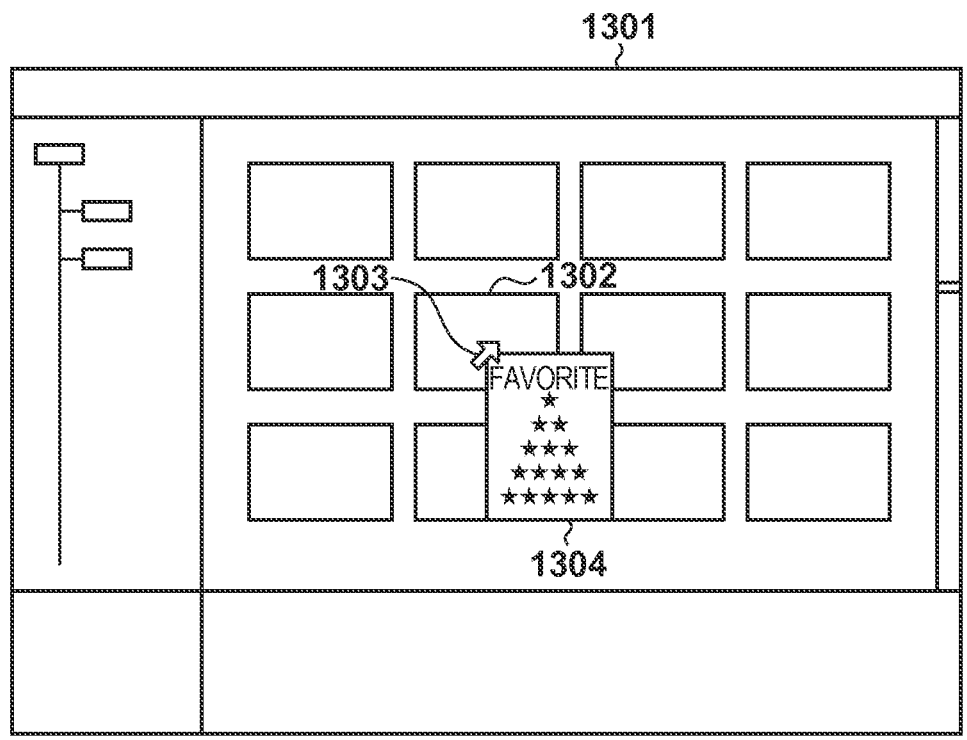
FIG. 13 is a view showing an example of a UI used to manually input the favorite rate.

An example of the image attribute information is the favorite rate of the user. The user can manually input the favorite rate representing whether he likes the image. For example, as shown in FIG. 13, the user selects a thumbnail image 1302 he wants on a UI 1301 by using a mouse pointer 1303 and right-clicks to display a dialog capable of inputting the favorite rate. The user can select the number of "★"s in the menu in accordance with his preference. In the embodiment, it is set to increase the number of "★"s as the favorite rate is higher.

The favorite rate may be set not manually by the user but automatically. For example, the number of times of viewing by the user may automatically be set as the favorite rate. Assume that the user clicks on a thumbnail (image file) he wants, and the state of the thumbnail image list display (UI 801) shown in FIG. 8 changes to a single image display screen. The transition count may be measured to automatically set the favorite rate in accordance with the count. That is, it is determined that the user likes the image much more as the number of times of viewing is larger.

As another example, the favorite rate may be automatically set in accordance with the number of times of printing. For example, when the user performs a print operation, it is determined that he likes the image, and the favorite rate is determined to be higher as the number of times of printing is higher.

As described above, the favorite rate is manually set by the user or automatically set based on the number of times of viewing or the number of times of printing.

The above-described attribute information is individually stored in the <UserInfo> tag of the database part 202 using the XML format as shown in FIG. 11. For example, the favorite rate is stored in a <FavoriteRate> tag, the number of times of viewing is stored in a <ViewingTimes> tag, and the number of times of printing is stored in a <PrintingTimes> tag.

Another attribute information set for each image is event information. Examples of the event information are the family travel "travel", graduation ceremony "graduation", and wedding "wedding".

Figure 14:
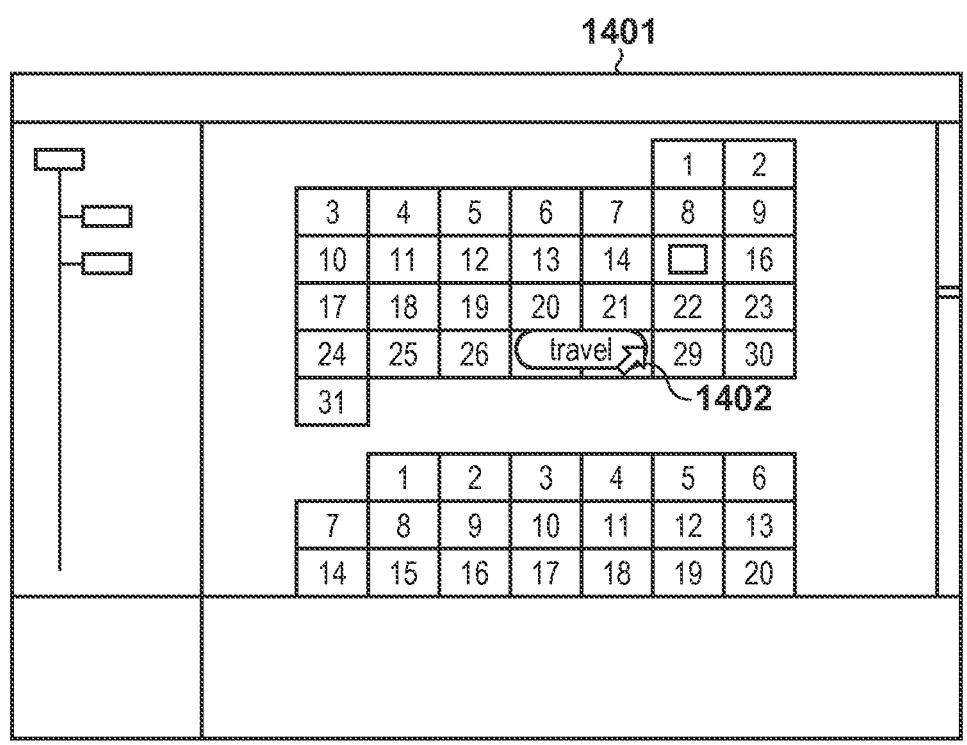
FIG. 14 is a view showing an example of a UI used to manually input event information.

To designate the event, for example, the user may designate a date he wants on a calendar represented on a UI 1401 of FIG. 14 using a mouse pointer 1402, and input the name of the event on that day. The designated event name (event information) is included in the XML format shown in FIG. 11 as part of the image attribute information. In the XML format, the event name and image are associated (linked) with each other using an <Event> tag in the <UserInfo> tag.

Next, person attribute information will be described with reference to FIG. 15.

FIG. 15 shows a UI 1501 for inputting person attribute information. In FIG. 15, reference numeral 1502 denotes a representative face image of a predetermined person (in this case, "father"). Reference numeral 1503 denotes a region where the name of the predetermined person is displayed. In 1504, a list of images which are detected from other images and are determined in step S506 to have similar face feature amounts is displayed.

Immediately after the end of sensing processing, no name is input for each person group, as shown in FIG. 7. However, an arbitrary person name can be input by designating the "No name" portion 703 with the mouse pointer. When the arbitrary person name is input, the name of the predetermined person is displayed in the region 1503, as shown in FIG. 15.

As attribute information of each person, the birthday of the person or the family relationship viewed from the user who operates the application can also be set. In the embodiment, when the user clicks on the representative face image 1502 of the person in FIG. 15, he can input the birthday of the clicked person by using a first input portion 1505, and family relationship information by using a second input portion 1506, as illustrated on the lower portion of FIG. 15.

Unlike the above-described image attribute information linked with the images, the input person attribute information is managed in the database part 202 separately from the image attribute information by using the XML format as shown in FIG. 16.

Figure 17:
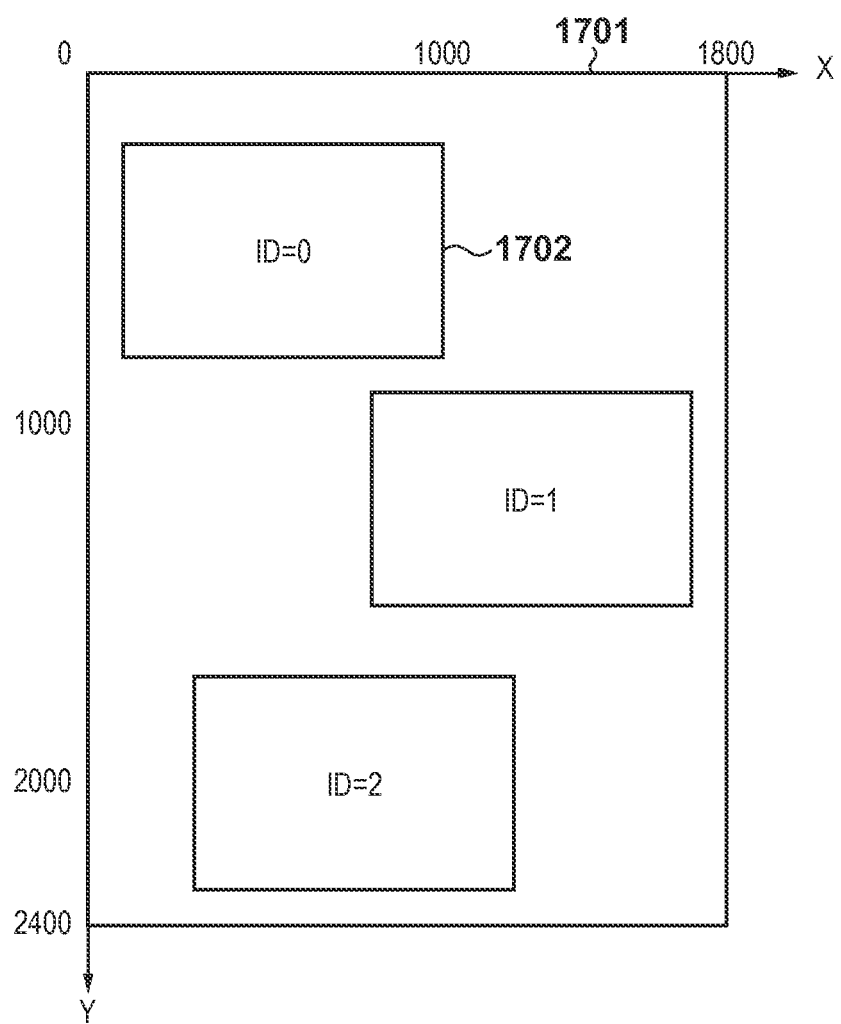
FIG. 17 is a view showing an example of a layout template.
Figure 19:
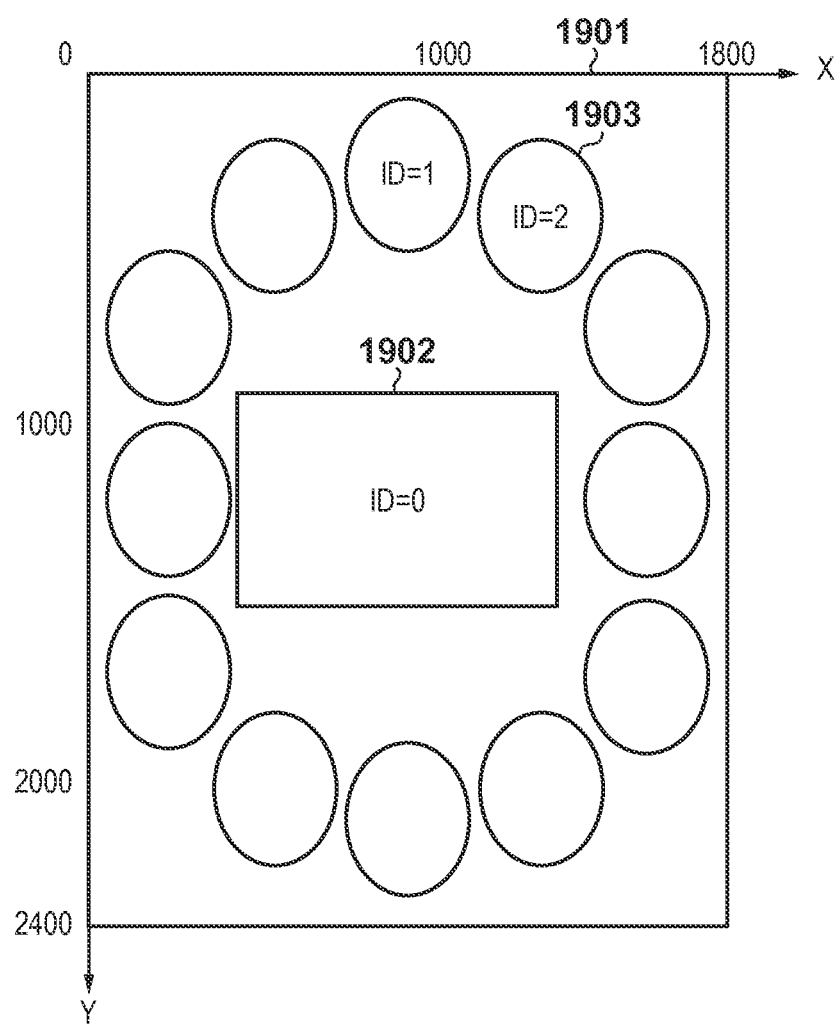
FIG. 19 is a view showing an example of a layout template.

In the first embodiment, various layout templates are prepared in advance. Examples of the layout templates are shown in FIGS. 17 and 19. Each layout template includes a plurality of image arrangement frames 1702, or 1902 and 1903 (to be synonymous with slots hereinafter) on a sheet 1701 or 1901 to lay out images.

Such layout templates are saved in the secondary storage apparatus 103 in advance when the software to execute the first embodiment is installed in the image processing apparatus 115. As another method, an arbitrary layout template may be acquired from the external server 114 present on the Internet 113 connected via the IF 107 or wireless LAN 109.

These layout templates are assumed to be described in a highly versatile structured language, for example, the XML format, similar to storage of a sensing processing result described above. FIGS. 18 and 20 show examples of XML data for the layout templates in FIGS. 17 and 19. In FIGS. 18 and 20, first, a <BASIC> tag describes basic information of a layout template. The basic information includes, for example, the theme of the layout template, the page size, and the page resolution (dpi). In FIGS. 18 and 20, a <Theme> tag representing the theme of the layout template is blank in the initial state of the layout template. As the basic information, the page size (<PageSize> tag) is set to A4, and the resolution (<Resolution> tag) is set to 300 dpi.

Subsequently, information of the above-described image arrangement frame is described by an <ImageSlot> tag. The <ImageSlot> tag holds two tags, that is, an <ID> tag and a <POSITION> tag to describe the ID and position of the image arrangement frame. The position information is defined in, for example, an X-Y coordinate system having its origin at the upper left corner, as shown in FIGS. 17 and 19.

The <ImageSlot> tag can also set, for each slot, the shape of the slot and the name of a recommended person group to be arranged.

For example, for the layout template of FIG. 17, the <Shape> tag of FIG. 18 describes a rectangular shape ("rectangle") for all slots, and the <PersonGroup> tag recommends to arrange "MainGroup" as the person group name.

For the layout template of FIG. 19, it is described that a slot with ID=0 arranged at the center has a rectangular shape ("rectangle"), as shown in FIG. 20. Also, it is recommended that "SubGroup" is arranged as the person group, and subsequent slots with ID=1 and 2 have an elliptical shape ("ellipse"), and "MainGroup" is arranged as the person group.

In the first embodiment, many layout templates of this type are held.

As described above, the application according to the embodiment can execute analysis processing for an input image group, automatically group persons, and display them on a UI. Viewing the result, the user can input attribute information such as a name and birthday for each person group and set the favorite rate or the like for each image.

Further, a number of layout templates classified by the theme can be held.

When the above-described conditions are satisfied, the application according to the embodiment performs, at a predetermined timing, processing of automatically generating a collage layout the user is likely to be fond of, and presenting it to the user (to be referred to as layout proposal processing hereinafter).

FIG. 6 shows the basic flowchart of the layout proposal processing.

First, in step S601, the scenario generation part 204 decides the scenario of proposal processing. The scenario includes the theme of a layout to be proposed, a layout template, setting of a person (main character) to be emphasized in the layout, and selection information of an image group to be used for layout generation.

Two scenario decisions will be described below.

For example, assume that it is set to automatically generate and present a collage layout two weeks before the birthday of each person. Also, assume that the first birthday of the person "son" automatically grouped in FIG. 15 will come two weeks later. In this case, the theme of the layout to be proposed is decided as the growth record "growth". Then, a template is selected. In this case, a layout template as shown in FIG. 19 suitable for the growth record is selected, and "growth" is described in the <Theme> tag of XML, as shown in FIG. 30. Next, "son" is set as the main character "MainGroup" on which focus is placed at the time of layout. Then, "son" and "father" are set as "SubGroup" on which focus is secondarily placed at the time of layout. An image group to be used for layout is selected. In this example, the database part 202 is referred to, and images including "son" are extracted and listed out of the images captured so far from the birthday of the person "son". The image list generated by the listing is stored and managed in the database part 202. The scenario decision for the growth record layout has been described.

As a different example, assume that it is set in advance to automatically generate and present a collage layout when there are travel photos captured within one month. If it is known based on the event information registered in FIG. 14 that the family traveled several days ago and images of the travel are saved in the secondary storage apparatus 103, the scenario generation part 204 decides a scenario to propose a layout of the family travel. In this case, the theme of the layout to be proposed is decided as the travel "travel". A layout template is selected. In this case, a layout template as shown in FIG. 17 is selected, and "travel" is described in the <Theme> tag portion of XML, as shown in FIG. 31. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database part 202 is referred to, and images linked with the travel event "travel" are extracted and listed. The image list generated by the listing is stored and managed in, for example, the database part 202. The scenario decision for the layout of the family travel has been described.

Figure 21:
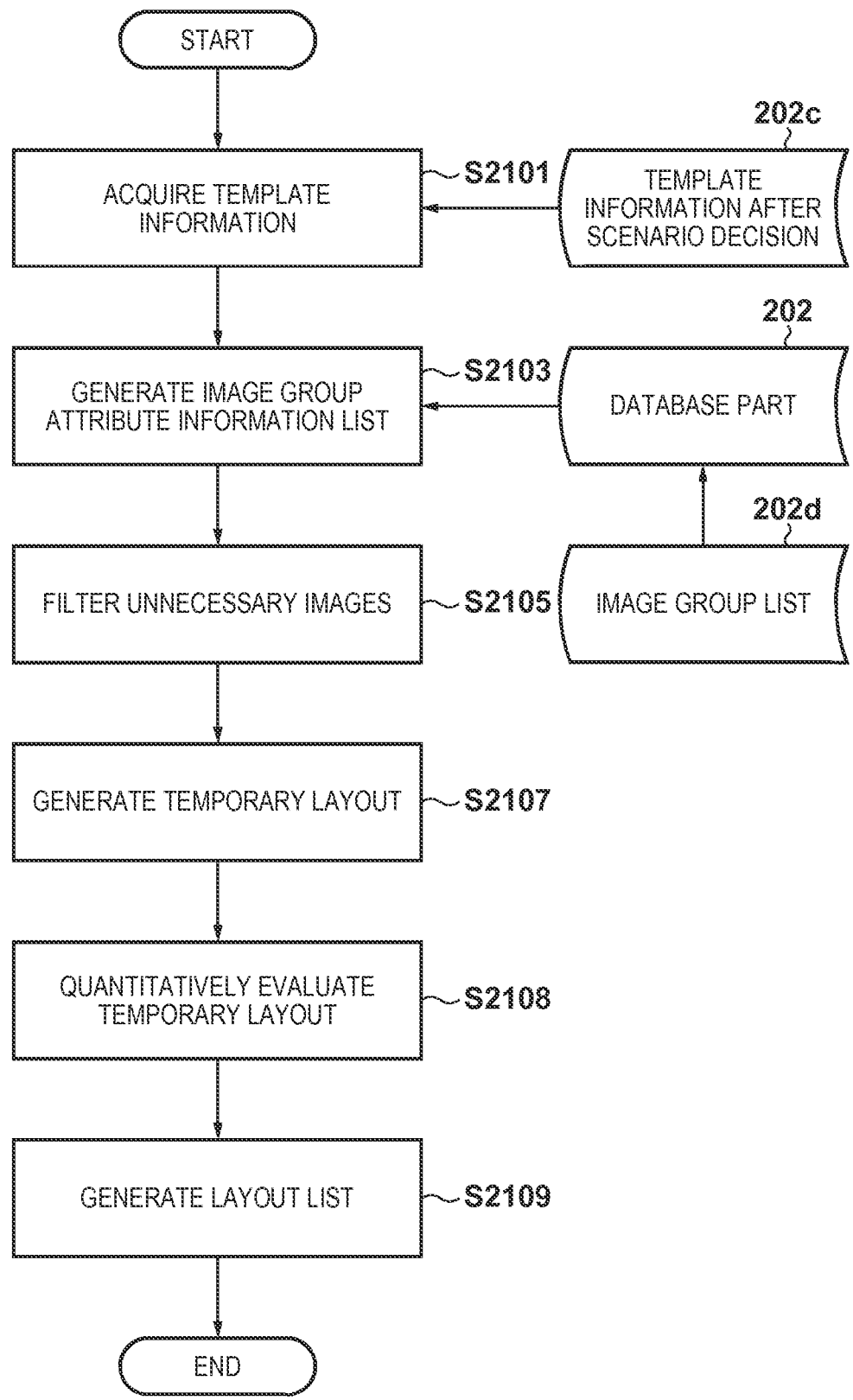
FIG. 21 is a flowchart of automatic layout generation processing according to the first embodiment.

In step S603 of FIG. 6, the layout generation part 205 executes automatic layout generation processing based on the above-described scenario. The automatic layout generation processing based on the scenario will be described here with reference to FIG. 21. FIG. 21 shows the detailed processing sequence of the layout processing part.

First, in step S2101, the layout generation part 205 acquires, from the database part 202, layout template information 202c after the layout theme and the person group information decided by the scenario are set.

Then, in step S2103, the layout generation part 205 acquires the feature amounts of each image from the database part 202 based on an image group list 202d decided by the scenario, and generates an image group attribute information list. The image group attribute information list has a structure in which the <IMAGEINFO> tags shown in FIG. 11 are arranged as many as the number of image lists. The layout generation part 205 performs the automatic layout generation processing in steps S2105 to S2109 based on the image group attribute information list.

As described above, in the automatic layout generation processing of the embodiment, attribute information stored in the database part 202 by performing sensing processing in advance for each image is used, instead of directly handling the image data itself. This is because if the image data itself is used when performing the layout generation processing, a very large memory area is required to store the image group. The utilization of the memory area can be reduced by using the attribute information stored in the database part 202, as in the embodiment.

In step S2105, the layout generation part 205 filters unnecessary images from the input image group by using the attribute information of the input image group. The filtering processing will be explained with reference to FIG. 22.

Figure 22:
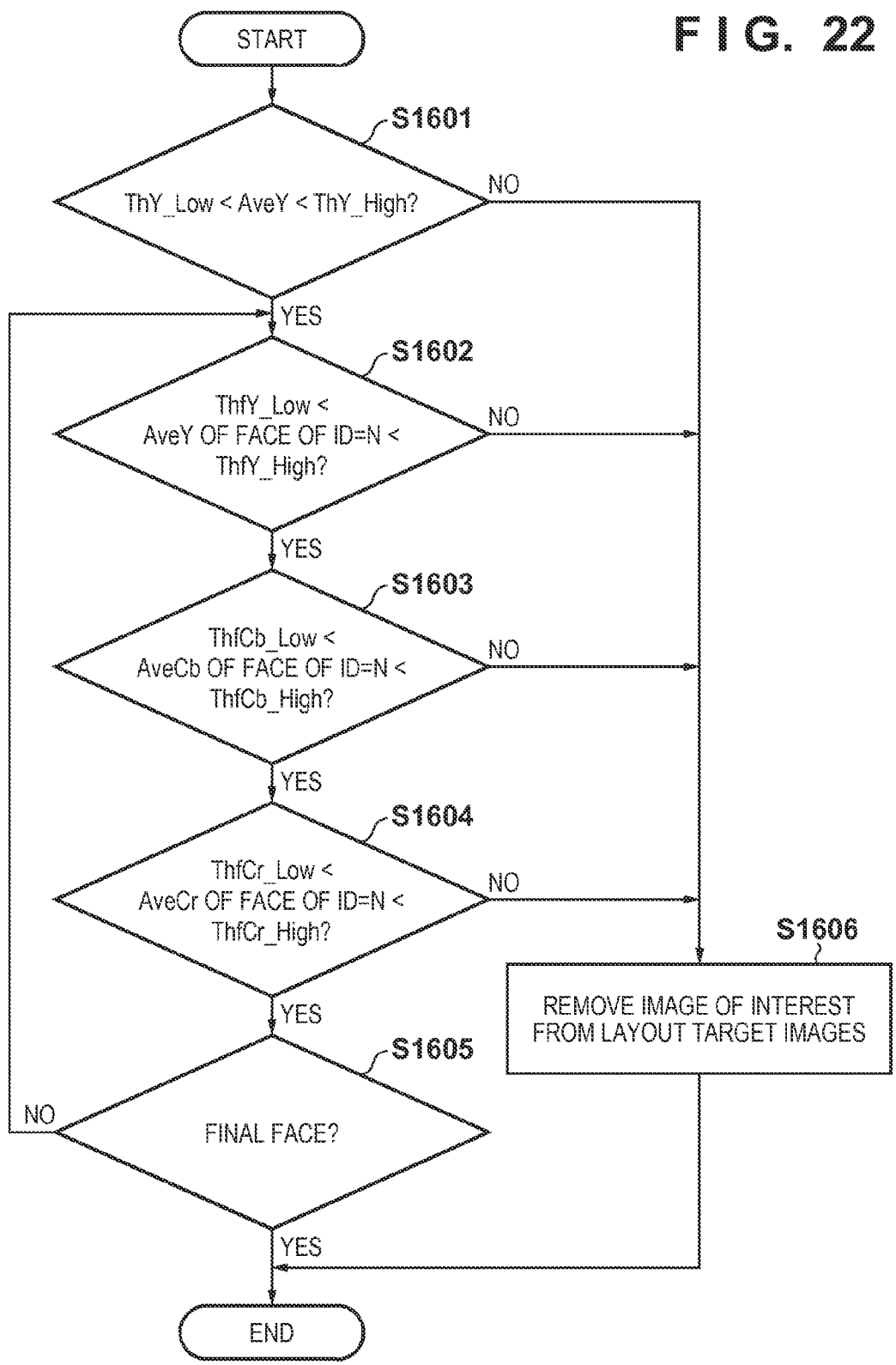
FIG. 22 is a flowchart of unnecessary image filtering processing according to the first embodiment.

FIG. 22 is a flowchart of the filtering processing.

In step S1601, the layout generation part 205 determines for each image whether the average luminance value AveY of the entire image falls within the range of predetermined thresholds ThY_Low and ThY_High. If the average luminance value AveY falls outside the range (NO in step S1601), the process advances to step S1606, and the layout generation part 205 removes the image of interest from the layout target image.

Similarly, in steps S1602 to S1605, the layout generation part 205 determines, for each face region included in the image of interest, whether the average luminance and color difference components (for example, AveY, AveCb, and AveCr components) fall within the ranges of predetermined thresholds representing a satisfactory flesh color region. More specifically, in step S1602, the layout generation part 205 determines whether AveY of a face region with ID=N falls within the range of predetermined thresholds ThfY_Low and ThfY_High. In step S1603, the layout generation part 205 determines whether AveCb of the face region with ID=N falls within the range of predetermined thresholds ThfCb_Low and ThfCb_High. In step S1604, the layout generation part 205 determines whether AveCr of the face region with ID=N falls within the range of predetermined thresholds ThfCr_Low and ThfCr_High. In step S1605, the layout generation part 205 determines whether the face is the final face. If the face is not the final face, the process returns to step S1602. If the face is the final face, the process ends.

Only an image for which all determinations of steps S1602 to S1605 end with "YES" is applied to subsequent layout generation processing.

Since this filtering processing aims at removing images that can obviously be determined to be unnecessary for the subsequent temporary layout creation processing, the thresholds are desirably set relatively leniently. For example, in the overall image luminance determination of step S1601, if the difference between ThY_High and ThY_Low is much smaller than the image dynamic range, the number of images determined as "YES" accordingly decreases. Hence, in the filtering processing of the embodiment, the difference between the thresholds is set as large as possible. In addition, thresholds which can remove an image that is obviously determined as an abnormal image are set.

Next, in step S2107 of FIG. 21, the layout generation part 205 generates an enormous number of (L) temporary layouts by using the image group determined as the layout target by the above-described processing of FIG. 22. Temporary layout generation is executed by repeating processing of arbitrarily applying an input image to an image arrangement frame of the acquired template. At this time, the following parameters (image selection, arrangement, and trimming criterion) are decided at random.

The image selection defines, for example, an image which should be selected from the image group when N image arrangement frames exist in the layout. The arrangement defines, for example, arrangement frames in which a plurality of selected images should be arranged. The trimming criterion defines a trimming ratio representing the degree of trimming processing to be performed for an arranged image.

Figure 23:
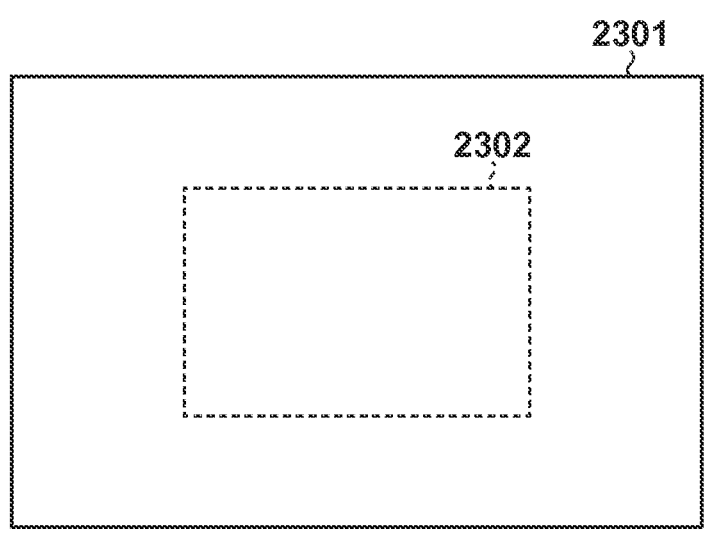
FIG. 23 is a view showing an example of automatic trimming processing.

The trimming ratio is represented by, for example, 0% to 100%. An image is trimmed using the center of the image as the reference, as shown in FIG. 23. In FIG. 23, reference numeral 2301 denotes an entire image; and 2302, a cutting frame for trimming at a trimming ratio of 50%.

Based on the above-described image selection, arrangement, and trimming criterion, temporary layouts are generated as many as possible. The generated temporary layouts can be expressed by XML, as shown in FIG. 32. The ID of the image selected and arranged in each slot is described by the <ImageID> tag, and the trimming ratio is described by the <TrimingRatio> tag.

Note that the number L of temporary layouts generated here is decided in accordance with the throughput of evaluation processing in a layout evaluation step to be described later and the performance of the image processing apparatus 115 that performs the processing. For example, several hundred thousand or more different temporary layouts are prepared. Each generated layout can be saved together with an ID in the secondary storage apparatus 103 as a file using the XML format shown in FIG. 32, or stored in the RAM 102 using another data structure such as a structure.

Next, in step S2108 of FIG. 21, the layout generation part 205 evaluates the L created temporary layouts by using predetermined layout evaluation amounts. FIG. 24 shows a list of layout evaluation amounts according to the embodiment. As shown in FIG. 24, the layout evaluation amounts used in the embodiment can be mainly divided into three categories.

Figure 25:
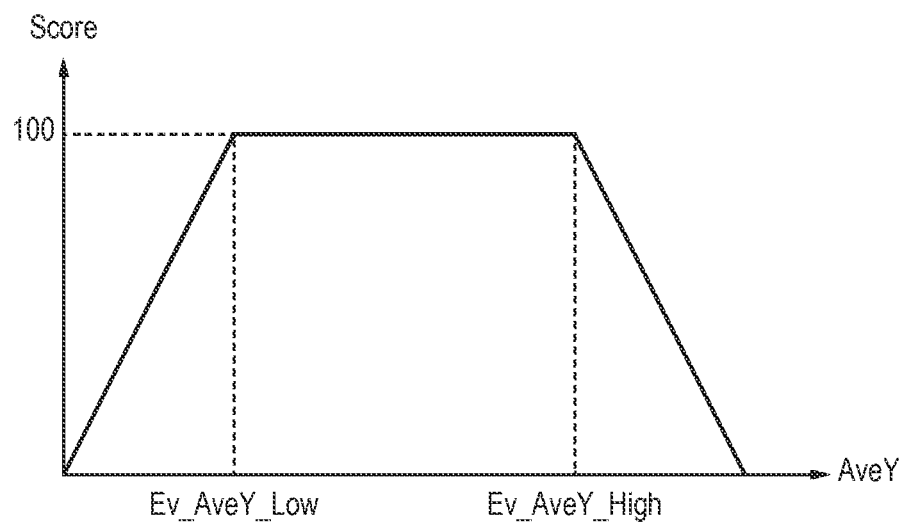
FIG. 25 is a graph for explaining a method of calculating brightness appropriateness.
Figure 26:
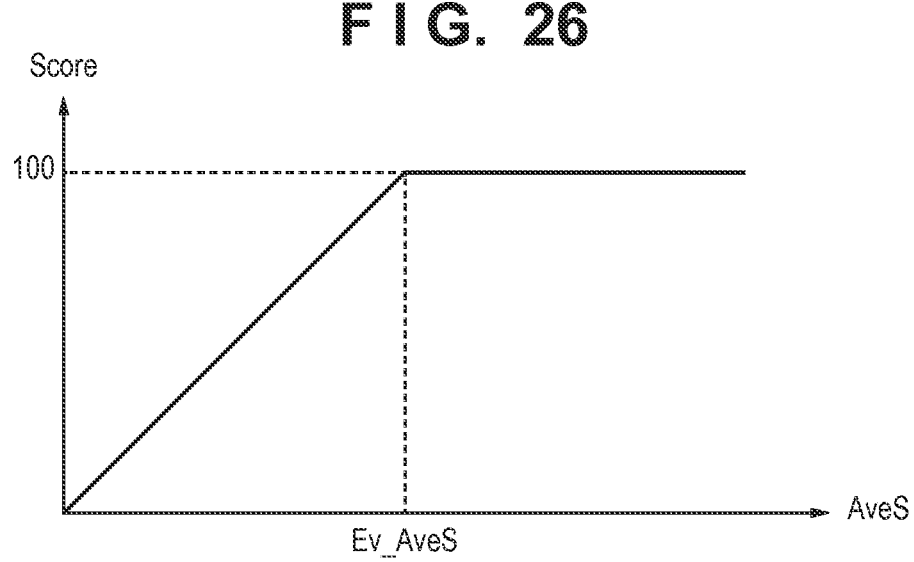
FIG. 26 is a graph for explaining a method of calculating saturation appropriateness.

The first evaluation category includes the evaluation amounts of each image. The evaluation amounts are used to determine states such as the brightness, saturation, and blur amount of an image and score the states. An example of scoring will be described below. The brightness appropriateness scores 100 when the average luminance falls within a predetermined threshold range, as shown in FIG. 25. The score is set to be lower when the average luminance falls outside the predetermined threshold range. The saturation appropriateness scores 100 when the average saturation of the entire image is larger than a predetermined saturation value, as shown in FIG. 26. The score is set to gradually decrease when the average saturation is smaller than the predetermined value.

The second evaluation category targets evaluation of matching between an image and a slot (image/slot matching evaluation). The image/slot matching is determined and scored. Examples of evaluation of the image/slot matching are person matching and trimming loss determination. The person matching represents the matching ratio of a person designated for a slot to a person who exists in an image actually arranged in the slot. For example, assume that "father" and "son" are designated for a slot as "PersonGroup" designated by XML. At this time, when the two persons are included in the image assigned to the slot, the person matching of the slot scores 100. If only one of the persons is included, the matching scores 50. If neither person is included, the matching scores 0. The matching in a slot is the average value of matchings calculated for respective slots.

Figures 27, 28:
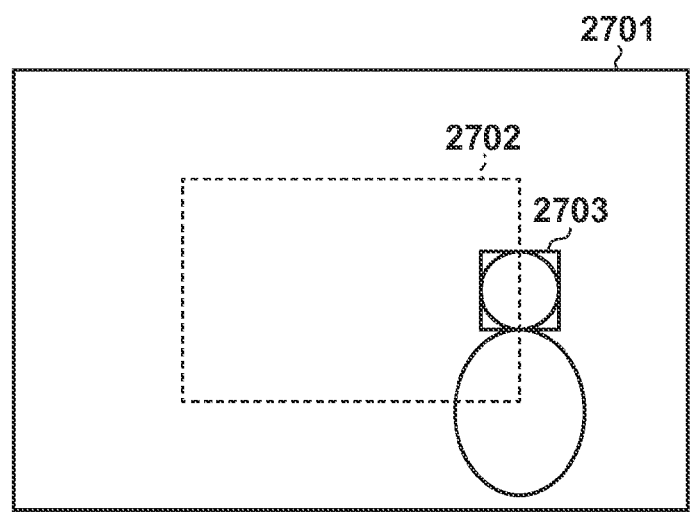
FIG. 27 is a view for explaining trimming loss determination processing.
FIG. 28 is a table for explaining image similarity determination processing.

Another image/slot matching evaluation value is loss determination of a trimming region 2702. For example, when a position 2703 of a face existing in an image 2701 is known, as shown in FIG. 27, scores of 0 to 100 are calculated in accordance with the area of the lost portion. If the area of the lost portion is 0, the score is 100. Conversely, if the whole face region is lost, the score is 0.

The third evaluation category evaluates the balance in a layout page (in-page balance evaluation). FIG. 24 shows image similarity, tone variation, and face size variation as the evaluation values used to evaluate the balance.

The "image similarity" will be described first. As the image similarity, the similarity between images is calculated for each of the enormous number of generated temporary layouts. For example, if only similar images that resemble each other are arranged at the time of creating a layout of the travel theme, the layout may be not good. For example, the similarity can be evaluated by the capturing date & time. If the capturing dates & times of images are close, the images are highly likely to have been captured at similar places. However, if the capturing dates & times are far off, both the places and the scenes are different at high possibility. The capturing date & time can be acquired from attribute information of each image, which is saved in the database part 202 in advance as image attribute information, as shown in FIG. 11.

To calculate a similarity from the capturing dates & times, the following calculation is performed. For example, assume that four images as shown in FIG. 28 are laid out in the temporary layout of interest. In FIG. 28, capturing date & time information is added to each image specified by an image ID. More specifically, year/month/day and time (AD: YYYY, month: MM, day: DD, hour: HH, minute: MM, second: SS) are added as a capturing date & time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is calculated. A similarity evaluation value Similarity[l] of the lth temporary layout can be calculated by Similarity[*l*]=100×stMinInterval[*l*]/MaxMinInterval That is, Similarity[l] is effective as the image similarity evaluation value because it comes close to 100 as the minimum capturing time interval becomes large, and close to 0 as the time interval becomes small.

The "tone variation" will be explained next as an evaluation value used to evaluate the balance in a layout page. For example, if only images of similar colors (for example, blue of a blue sky, green of a mountain) are arranged at the time of creating a layout of the travel theme, the layout may be not good. In this case, the tone variation is set large. In this case, the variance of the average hues AveH of images present in the lth temporary layout of interest is calculated and stored as a tone variation tmpColorVariance[l]. A maximum value MaxColorVariance in tmpColorVariance[l] is calculated. A tone variation evaluation value ColorVariance[l] of the lth temporary layout can be calculated by ColorVariance[*l*]=100×tmpColorVariance[*l*]/MaxColorVariance That is, ColorVariance[l] is effective as the tone variation evaluation value because it comes close to 100 as the variation of the average hues of images arranged in a page becomes large, and close to 0 as the variation of the average hues becomes small.

The "face size variation" will be explained next as an evaluation value used to evaluate the balance in a layout page. For example, if only images of similar face sizes are arranged in a layout result at the time of creating a layout of the travel theme, the layout may be not good. Assume that a good layout is obtained when images of a variety of face sizes, including small and large face sizes on the sheet surface after layout, are arranged with good balance. In this case, the face size variation is set large. Hence, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is calculated. A face size variation evaluation value FaceVariance[l] of the lth temporary layout can be calculated by FaceVariance[*l*]=100×tmpFaceVariance[*l*]/MaxFaceVariance That is, FaceVariance[l] is effective as the face size variation evaluation value because it comes close to 100 as the variation of face sizes arranged on the sheet surface becomes large, and close to 0 as the variation of the face sizes becomes small.

As another category, user taste evaluation is usable.

The plurality of evaluation values described above, which are calculated for each temporary layout, are integrated and referred to as a layout evaluation value for each temporary layout. Let EvalLayout[l] be the integrated evaluation value of the lth temporary layout, and EvalValue[n] be N evaluation values (including the evaluation values shown in FIG. 24) calculated above. At this time, the integrated evaluation value can be obtained by $$EvalLayout[l] = \sum_{n=0}^{N} EvalValue[n] \times W[n] \quad (2)$$

where W[n] is the weight of each evaluation value shown in FIG. 24 for each scene. As a feature of this weight, a different weight is set for each layout theme. For example, the themes of the growth record "growth" and travel "travel" are compared, as shown in FIG. 24. For the travel "travel", a number of photos whose quality is as high as possible are laid out in a variety of scenes, and settings are done with a tendency to emphasize the individual evaluation values of the images and the in-page balance evaluation values. On the other hand, for the growth record "growth", whether the main character as the growth record target properly matches each slot is more important than the image variation, and settings are done with a tendency to emphasize the image/slot matching evaluation than in-page balance or the individual evaluation of images.

In step S2109, the layout generation part 205 generates a layout list LayoutList[k] for layout result display by using EvalLayout[l] calculated in the above-described way. For the layout list, identifier l is stored in descending order of evaluation values out of EvalLayout[l] for a predetermined number of (for example, five) layouts. For example, if the temporary layout created at l=50th time has the highest score, LayoutList[0]=50. Similarly, after LayoutList[1], identifier l for the second highest score is stored.

In step S605 of FIG. 6, the rendering part 206 renders the layout result obtained by the layout generation processing described with reference to FIG. 21, and displays the result. In the embodiment, the rendering result is displayed on a UI 2901 in FIG. 29. In step S605, first, the rendering part 206 reads out the layout identifier stored in LayoutList[0], and reads out the temporary layout result corresponding to the layout identifier from the secondary storage apparatus 103 or RAM 102. In the layout result, as described above, template information and image names assigned to the respective slots present in the template are set. In step S605, the rendering part 206 renders the layout result based on these pieces of information using the rendering function of the OS running on the image processing apparatus 115, and displays the rendering result like a layout result 2902 in FIG. 29.

When the user presses a Next button 2904, the identifier of LayoutList[1] with the next score is read out. The layout result is rendered and displayed in the same manner as described above. This allows the user to view variations of proposed layouts. The user can also redisplay the layout displayed previously by pressing a Previous button 2903. If the user likes the displayed layout, he can press a Print button 2905 to cause the printer 112 connected to the image processing apparatus 115 to print the layout result 2902.

Next, control at the time of creating a face dictionary used for personal recognition according to the embodiment will be described in detail.

In the embodiment, category determination conditions to be registered in one of a plurality of types of categories are changed in accordance with the age and sex (individual information) in dictionary registration. For descriptive convenience, the number of categories corresponding to the age will be exemplified.

Face dictionary creation processing to be used in personal recognition according to the embodiment will be described in detail. In the embodiment, the degree of blurring of a detected face image is calculated, and the state of the face image is determined based on the calculated degree.

FIG. 33 is a block diagram showing an example of the arrangement of a face dictionary creation apparatus for personal recognition according to the first embodiment. Note that the building components of the face dictionary creation apparatus may be implemented by hardware, software which is implemented by control of the CPU 100 of the image processing apparatus 115 in FIG. 1, or a combination of the hardware and software.

An image input part 3301 rasterizes input image data in the RAM 102.

A face detection part 3302 detects a face in the image data in the RAM 102 that has been processed by the image input part 3301. The face detection processing has been described in background sensing and database registration.

A face feature amount extraction part 3303 receives the image data input from the image input part 3301, and the face detection position detected by the face detection part 3302.

In the embodiment, the face feature amount is a face feature amount vector which represents a frequency response to each organ, but another feature amount is usable.

A face dictionary reading part 3304 searches for face dictionary data present at a designated location in the secondary storage apparatus 103. If there is a face dictionary created in advance, the face dictionary reading part 3304 reads it. If there is no face dictionary created in advance, the face dictionary reading part 3304 does not perform face dictionary reading processing. Face feature amount vectors are registered in the face dictionary. The face dictionary save location is a designated location in the secondary storage apparatus 103 in the embodiment, but may be another location. In reading data, the face dictionary reading part 3304 analyzes dictionary data and sets the number of registered face feature amount vectors.

The structure of the face dictionary will be explained in detail. FIG. 34 is a view showing the inside of the face dictionary. An ID 3401 represents a person identifier. The number of IDs is not particularly limited and changes in accordance with the number of persons and other settings. A category (classification) 3402 categorizes and manages feature amounts in accordance with a standard set manually or automatically. In the embodiment, feature amounts are categorized and managed in accordance with, for example, the age for each person. The number of categories may change depending on the ID. A face feature amount vector group 3403 manages face feature amount vectors extracted by the face feature amount extraction part 3303. In FIG. 34, a face feature amount vector group 3404 is managed for each category.

In FIG. 33, a similarity determination part 3305 receives the face feature amount extracted by the face feature amount extraction part 3303, and the face dictionary data read by the face dictionary reading part 3304. In this case, the similarity determination part 3305 determines a similarity by comparing (matching processing), as similarities, distances between the face feature amount vector extracted by the face feature amount extraction part 3303 and face feature amount vectors registered in the face dictionary. Similarity determination is performed as a round-robin in each category for each ID in FIG. 34. A similarity corresponding to the shortest distance between the face feature amount vector extracted by the face feature amount extraction part 3303 and a face feature amount vector registered in the face dictionary data is output as a similarity result. More specifically, a face dictionary ID having the shortest distance from the extracted face feature amount vector, and the distance are output. If the distance calculated as a similarity is equal to or smaller than a predetermined threshold (in other words, the similarity between a face feature vector and another face feature amount vector falls within a predetermined similarity range), the similarity determination part 3305 determines that these face feature amount vectors represent the same person. If the similarity determination part 3305 determines that these face feature amount vectors represent the same person, it sends back the same ID as that of a person determined to be the same. If the calculated distance is larger than the predetermined threshold, the similarity determination part 3305 determines that these face feature amount vectors represent anotherperson. If the similarity determination part 3305 determines that these face feature amount vectors represent anotherperson, an unused new ID is assigned. Note that similarity determination is not limited to this method, and another similarity determination method may be used for the determination.

A face state determination part 3306 receives the image data input from the image input part 3301, and face image data detected by the face detection part 3302, and determines the degree of blurring (scale representing a state) of the face image of the detected face image data.

Only when the result of determination by the face state determination part 3306 is OK (the scale representing a state is equal to or higher than a threshold), a person group display part 3307 displays a person group. When the result of determination by the face state determination part 3306 is NG (the scale representing a state is lower than the threshold), that is, the state of the face image is poor, the person group display part 3307 does not display a person group.

A face dictionary registration part 3308 receives the face feature amount extracted by the face feature amount extraction part 3303 and the identifier (ID) obtained by the determination by the similarity determination part 3305, and registers them in the face dictionary in association with a predetermined ID and the extracted face feature amount.

Next, the operation procedures of the face dictionary creation apparatus will be described. FIG. 35 is a flowchart showing processing by the face dictionary creation apparatus according to the first embodiment.

First, in step S3501, the image input part 3301 inputs an image and rasterizes it in the RAM 102.

Then, in step S3502, the face detection part 3302 detects a face in the image data in the RAM 102 that has been processed by the image input part 3301. At this time, a provisional identifier (ID) is set for the detected face image data.

In step S3503, the face feature amount extraction part 3303 generates a normalized face image, similar to step S504 described above. Generation of the normalized face image is the same as that in step S504, and a description thereof will not be repeated.

In step S3504, the face feature amount extraction part 3303 extracts the face feature amounts of the normalized face image based on the face detection position obtained by the face detection part 3302.

In step S3505, the similarity determination part 3305 performs similarity determination. First, the face dictionary reading part 3304 reads face dictionary data from a designated location in the secondary storage apparatus 103. Then, the similarity determination part 3305 calculates a similarity by comparing (matching) distances between the face feature amount vector extracted by the face feature amount extraction part 3303 and face feature amount vectors registered in the face dictionary 202a. The similarity determination part 3305 calculates a similarity and performs similarity determination based on the calculated similarity.

In accordance with the similarity determination result, the setting of the provisional identifier (ID) is changed. If it is determined in the similarity determination of step S3505 that the similarity falls outside a predetermined range, in other words, it is determined that the face feature amount vectors represent another person, an unused new ID is assigned and set instead of the provisional ID in step S3506. If it is determined in the similarity determination of step S3505 that the similarity falls within the predetermined range, in other words, it is determined that the face feature amount vectors represent the same person, the same existing ID as that of a person determined to be the same is sent back, and the provisional ID is settled as a normal ID in step S3510.

In step S3507a, the face state determination part 3306 determines the state of the face in the image having the new ID.

If the face state is good, the process advances to step S3508a, and the person group display part 3307 displays the image on the UI. For example, the image is displayed on the person group UI 704, as shown in FIG. 7. That is, the image having the new ID is classified and managed for each person group, and displayed on the UI. Although the image having the new ID is displayed on the UI, it may be managed by the person group without UI display.

If the face state is not good, that is, is poor, the process skips to step S3513. The face image in a poor state is excluded from registration targets of the face dictionary registration part 3308.

In step S3508b, the person group display part 3307 displays the image having the existing ID on the UI. For example, the image is displayed on the person group UI 704, as shown in FIG. 7. That is, the image having the existing ID is classified and managed for each person group, and displayed on the UI. Although the image having the existing ID is displayed on the UI, it may be managed by the person group without UI display.

In step S3507b, the face state determination part 3306 determines the state of the face in the image having the existing ID. If the face state is good, the process advances to step S3509, and the face state determination part 3306 performs face dictionary registration. If the face state is not good, that is, is poor, the process skips to step S3513. The face image in a poor state is excluded from registration targets of the face dictionary registration part 3308.

In step S3509, the face dictionary registration part 3308 specifies a category for registration in accordance with the set identifier and corresponding category. The face feature amount vector to be processed is registered in the specified category in the face dictionary.

In step S3512, the face dictionary creation apparatus determines whether it has performed a series of processes in steps S3502 to S3509 for all face detection results. If the face dictionary creation apparatus has performed a series of processes for all detection results, it advances to the next process. If the face dictionary creation apparatus has not performed a series of processes for all detection results, the process returns to step S3503, and the face dictionary creation apparatus executes the series of processes in steps S3502 to S3509 for an unprocessed face detection result.

In step S3513, the face dictionary creation apparatus determines whether it has performed a series of processes in steps S3502 to S3512 for all set images. If the face dictionary creation apparatus has performed a series of processes for all images, it ends the process. If the face dictionary creation apparatus has not performed a series of processes for all images, the process returns to step S3502, and the face dictionary creation apparatus executes the series of processes in steps S3502 to S3512 for an unprocessed image.

As a result of performing the above-described processing, the number of feature amounts registered in the face dictionary and the number of images of a group displayed on the UI may differ from each other. In some cases, the internal structure of the face dictionary in FIG. 34 and the UI display example in FIG. 7 are different as a result of comparison. This is because a face image determined to be in a poor state as a result of determination by the face state determination part 3306 is not registered in the face dictionary, but an ID is assigned in face detection and is displayed on the person group UI 704. Since an image in a poor face state, which is unsuited to face detection, is not registered in the face dictionary, the personal recognition accuracy can be increased. Since all read images are displayed on the UI, even an image in a poor face state, which is unsuited to face detection, is displayed.

In the embodiment, only an image which is determined to be in a good state in the face state determination of step S3507a is displayed on the UI in step S3508a in order to correctly group face feature amounts in subsequent similarity determination for the next image. If a face state is determined after calculating a similarity and displaying the face on the UI, and the image is in a poor face state and is not registered in the dictionary, a feature amount to be registered in the dictionary becomes blank. That is, even if the image is displayed on the UI, its feature amount does not exist for a corresponding ID in the dictionary. When a similar image of the same person is obtained, no feature amount exists for the corresponding ID in the dictionary, thus feature amounts cannot be compared, and another ID is newly assigned to display the image on the UI.

Figure 36:
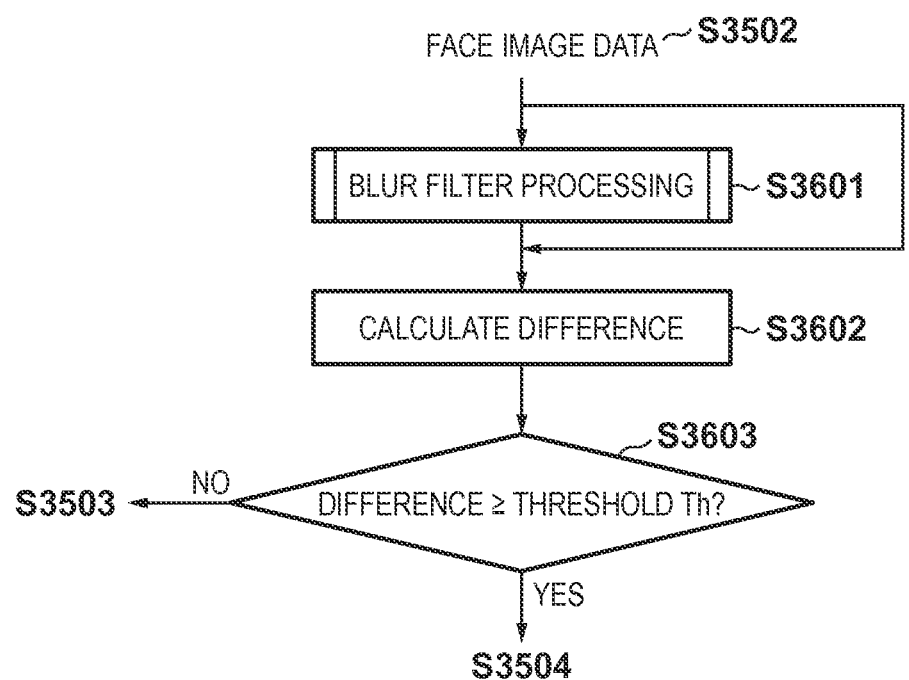
FIG. 36 is a flowchart showing details of face state determination processing.

A face state determination processing sequence will be explained with reference to FIG. 36. FIG. 36 is a flowchart showing details of step S3503.

The face state determination part 3306 determines the face state of face image data detected by the face detection part 3302. First, in step S3601, the face state determination part 3306 performs filter processing at, for example, a 5×5 pixel size, generating a blurred image. In step S3602, the face state determination part 3306 accumulates, for each block, the difference between the signal value of the generated blurred image and that of an original image before the filter processing. More specifically, the differences of the R, G, and B components are calculated. In step S3603, the face state determination part 3306 compares the calculated difference accumulation result with a predetermined threshold. If the difference accumulation result (scale representing a state) is equal to or larger than the threshold, the face state determination part 3306 determines that the face image state is good, and the process advances to step S3305 to be performed by the face feature amount extraction part 3303 after step S3504. If the difference accumulation result (scale representing a state) is smaller than the threshold, the face state determination part 3306 determines that the face image state is poor, and performs the above-described series of processes for the next unprocessed face detection result.

In the embodiment, the R, G, and B components are used as parameters for calculating determination. However, the present invention is not limited to this, and the luminance component may be calculated. Alternatively, only the G component to which the person visual sensitivity is high may be used. The size of the filter for generating a blurred image is not limited to 5×5 pixels. The part of analysis is not limited to a block and may be a pixel. The method of determining the face state is not limited to the above-described one, and another method is available.

As described above, according to the embodiment, when a detected face image is in a poor state, it is excluded from processing targets of face dictionary registration, and only a face image in a good state is registered in the face dictionary.

As a result, only face images in a good state are registered in the face dictionary, and a high-accuracy face dictionary can be created. This can increase the recognition accuracy of a face image and prevent a decrease in the recognition accuracy of a face image to be newly recognized.

In the first embodiment, when a detected face image is in a poor state, it is excluded from processing targets of face dictionary registration. However, this detected face image can be managed as one image of a similar face image group without any problem, and thus is classified into a person group.

As described above, the first embodiment can optimize a person group while increasing the dictionary registration accuracy.

In the first embodiment, determination processing is performed by analyzing the degree of blurring or defocusing in determination of a face image state. That is, the face image state is determined by confirming the edge of the face image. This can increase the dictionary registration accuracy.

(Second Embodiment)

The second embodiment is the same as the first embodiment except that the image data size is changed, so a description of the same parts as those in the first embodiment will not be repeated.

In the second embodiment, a similarity determination part 3305 determines a face state by using image data whose resolution is changed so that its size becomes larger than at least the image size of detected face image data.

In the second embodiment, in step S3502 of FIG. 35, a face detection part 3302 resizes input image data to a minimum size capable of face detection. For example, the input image data is resized to a QVGA (Quarter Video Graphics Array) size at, for example, a 320×240 pixel resolution. That is, face detection is performed at a low resolution. Therefore, face detection can be executed quickly. This is effective for executing face detection without decreasing the sensing speed especially when image data as many as several thousands or several ten thousands are handled in layout generation.

In face state determination processing, the input image data is scaled, and the scaled image data is processed. At this time, the resolution is changed to set a size larger than the image size of at least detected face image data. Accordingly, face state determination can be performed at higher accuracy.

FIG. 37 is a flowchart showing details of step S3503 according to the second embodiment. First, in step S3701, an image sensing part 203 reads detected face image data and detected face image size data representing the size of the detected face image data, and sets a high-resolution image size larger than the detected face image size. Then, in step S3702, the image sensing part 203 resizes the detected face image data to a VGA (Video Graphics Array) size at, for example, a 640×480 pixel resolution. The face state of the resized image data is determined. Details of a face state determination part 3306 are the same as those in the first embodiment, and a description thereof will not be repeated.

As described above, according to the second embodiment, image data lower in resolution than input image data is used for face detection, and image data higher in resolution than the low-resolution image data is used for face state determination. In addition to the effects described in the first embodiment, the processing speed and face state determination accuracy can be increased.

(Third Embodiment)

The third embodiment is the same as the first embodiment except for face state determination, so a description of the same parts as those in the first embodiment will not be repeated.

In the third embodiment, the value of a frequency component higher than a predetermined frequency component is calculated by performing fast Fourier transform (FFT) processing for a face region, and the calculated value is used for face state determination. At this time, the value of a high frequency component when FFT processing is performed for a face (reference face) serving as an appropriate reference is held in advance as a reference value. When the ratio of a calculated value (scale representing a state) to the reference value is lower than a predetermined value (N %) (or lower than the reference value), it is determined that the face region blurs (state is poor). If the state is determined to be poor, image data to be processed is excluded from subsequent processing targets in step S3503, and a series of processes is executed for an unprocessed face detection result.

Figure 38A:
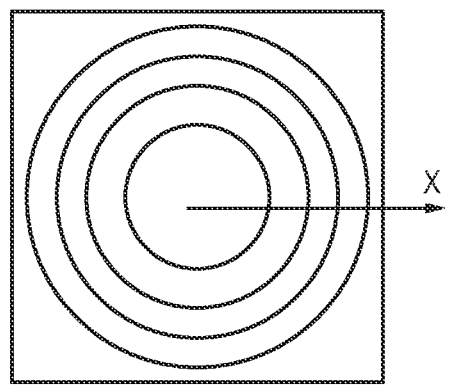
FIGS. 38A and 38B are a view and graph, respectively, for explaining face state determination processing.
Figure 38B:
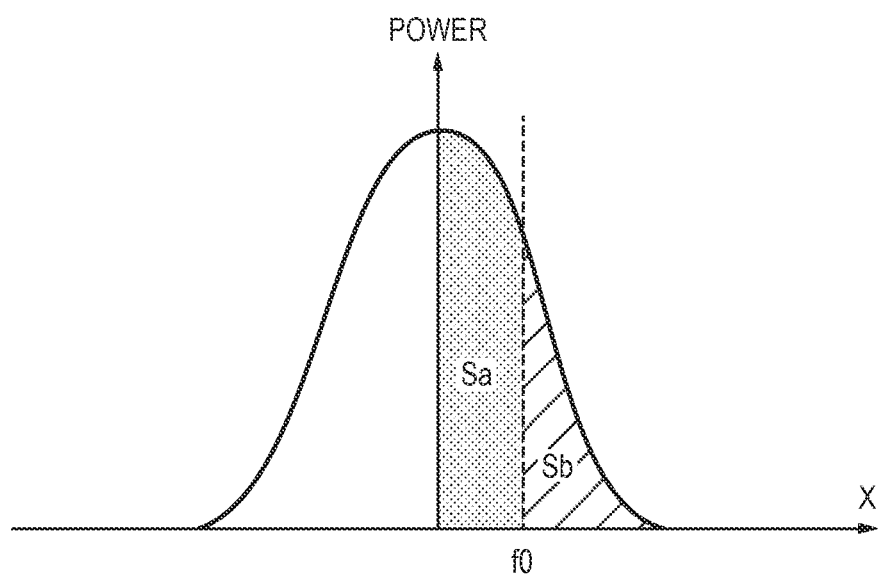

The frequency component to be used for face state determination will be explained with reference to FIGS. 38A and 38B. FIG. 38A shows a spatial frequency image in the face image region. FIG. 38B shows a spatial frequency characteristic result. A boundary frequency f0 is set, frequencies lower than f0 are defined as low frequency components, and Sa is the ratio of low frequency components to the face image region. Also, frequencies equal to or higher than f0 are defined as high frequency components, and Sb is the ratio of high frequency components to the face image region. Sda and Sdb are the ratio of low frequency components of the appropriate reference face, and that of high frequency components, respectively. The frequency f0 used to determine a high frequency component can be appropriately set.

$$N = Sdb/Sda$$

If the calculated value Sb/Sa is lower than N % of the reference value (lower than a predetermined ratio), it is determined that the face region blurs (the state is poor). If the calculated value Sb/Sa is equal to or higher than N % of the reference value, it is determined that the face region does not blur (the state is good).

As described above, according to the third embodiment, the face state can be determined based on the value of the high frequency component of detected face image data. The face state determination based on the frequency component is suitable for extracting the feature amount of a face part such as an organ (for example, an eye, mouth, or nose) or an eyebrow, and the feature amount of the face part can be reliably extracted. When the face state is determined using the luminance value, the feature amount of an organ cannot be properly extracted, decreasing the face state determination accuracy. To the contrary, in the third embodiment, a feature amount is extracted based on a frequency component, so the face state determination accuracy can be greatly increased.

(Fourth Embodiment)

The fourth embodiment is the same as the first embodiment except for the arrangement of a face dictionary creation apparatus for personal recognition and the operation procedures of the face dictionary creation apparatus, so a description of the same parts as those in the first embodiment will not be repeated.

Figure 39:
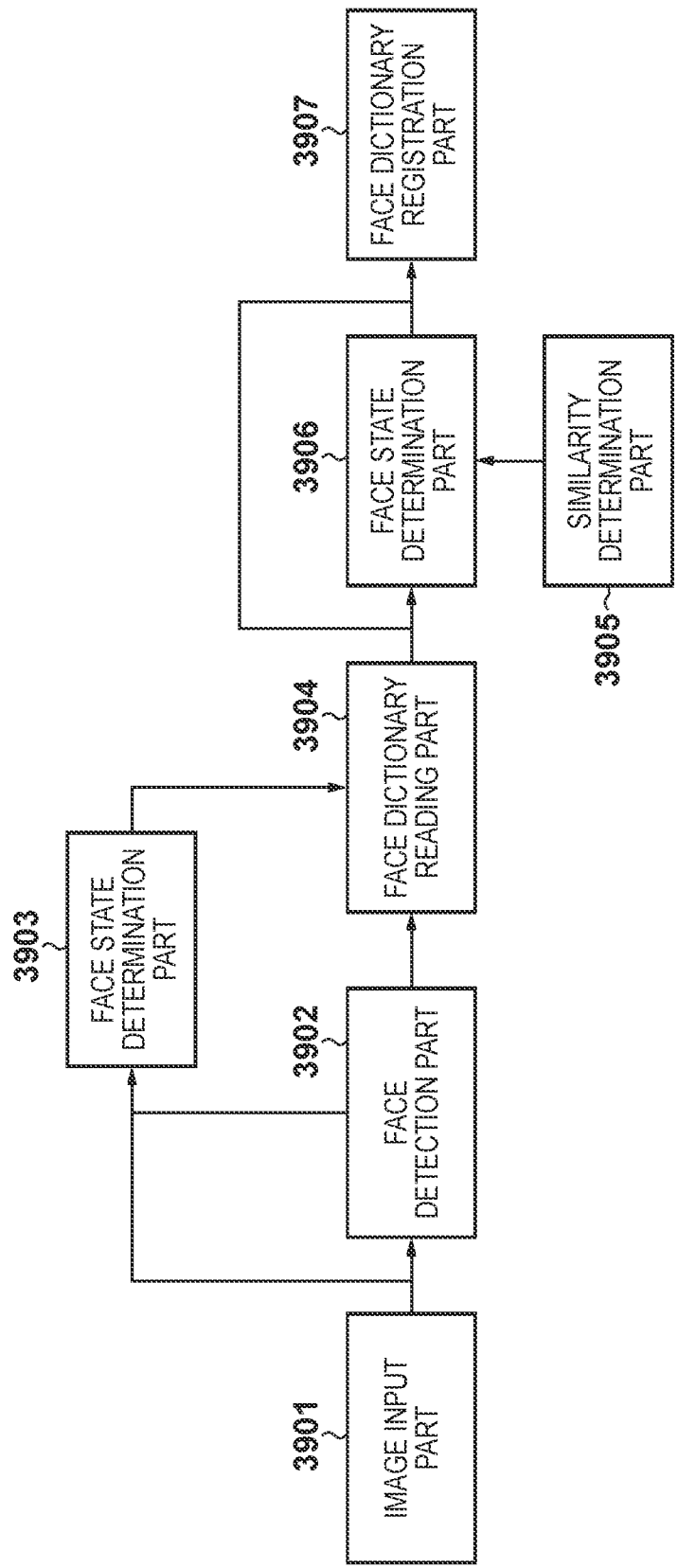
FIG. 39 is a block diagram for explaining a face dictionary creation apparatus.

FIG. 39 is a block diagram showing an example of the arrangement of a face dictionary creation apparatus for personal recognition according to the fourth embodiment. Note that the building components of the face dictionary creation apparatus may be implemented by hardware, software which is implemented by control of a CPU 100 of an image processing apparatus 115 in FIG. 1, or a combination of the hardware and software.

An image input part 3901 is the same as the image input part 3301 in the first embodiment, and a description thereof will not be repeated.

A face detection part 3902 is the same as the face detection part 3302 in the first embodiment, and a description thereof will not be repeated.

A face state determination part 3903 receives image data input from the image input part 3901, and face image data detected by the face detection part 3902, and determines the degree of blurring (scale representing a state) of a face image in the detected face image data.

A face feature amount extraction part 3904 receives the image data input from the image input part 3901, and a face detection position detected by the face detection part 3902. Further, the face feature amount extraction part 3904 receives the result of determination by the face state determination part 3903. Only when the determination result is OK (the scale representing a state is equal to or larger than a threshold), the face feature amount extraction part 3904 extracts a face feature amount in the face region based on the face detection position obtained for the input image by the face detection part 3902. More specifically, if the result of determination by the face state determination part 3903 is NG (the scale representing a state is lower than the threshold), that is, the state of the face image is poor, the face feature amount extraction part 3904 does not extract the face feature amount in the face region. That is, a face image including the face region is excluded from extraction targets of the face feature amount extraction part 3904. In other words, execution of subsequent processes (for example, similarity determination and face dictionary registration) after the face feature amount extraction part 3904 is inhibited. Hence, a face image in a poor state is excluded from registration targets of a face dictionary registration part 3907. In the embodiment, the face feature amount is a face feature amount vector which represents a frequency response to each organ, but another feature amount is usable.

A face dictionary reading part 3905 is the same as the face dictionary reading part 3304 in the first embodiment, and a description thereof will not be repeated.

A similarity determination part 3906 is the same as the similarity determination part 3305 in the first embodiment, and a description thereof will not be repeated.

The face dictionary registration part 3907 is the same as the face dictionary registration part 3308 in the first embodiment, and a description thereof will not be repeated.

As described above, according to the fourth embodiment, when a detected face image is in a poor state, it is excluded from processing targets of subsequent face feature amount extraction, similarity determination, and face dictionary registration. Only a face image in a good state is registered in the face dictionary. As a result, a face image in a good state is registered in the face dictionary, and a high-accuracy face dictionary can be created. This can increase the recognition accuracy of a face image and prevent a decrease in the recognition accuracy of a face image to be newly recognized.

In the fourth embodiment, when a detected face image is in a poor state, it is excluded from processing targets of face dictionary registration. However, this detected face image can be managed as one image of a similar face image group without any problem, and thus is classified into a person group.

As described above, the fourth embodiment can optimize a person group while increasing the dictionary registration accuracy.

In the fourth embodiment, determination processing is performed by analyzing the degree of blurring or defocusing in face image state determination. That is, the state of a face image is determined by confirming the edge of the face image. This can increase the dictionary registration accuracy.

(Other Embodiments)

Although the embodiments of the present invention have been described, the basic arrangement of the present invention is not limited to the above-described ones.

The above-described embodiments are examples for obtaining the effects of the present invention. If the same effects as those of the present invention are obtained by using another similar method or different parameters, this also falls within the scope of the invention.

In the above-described embodiments, face detection processing needs to reduce the processing load, so an existing method such as a bilinear method is usable as long as a face can be detected.

The scaling method for face state determination processing is a bicubic method rather than a bilinear method in order to increase the accuracy. The scaling method for face state determination processing is not particularly limited, and another method is usable.

In the second embodiment, the face state determination part 3306 scales detected face image data. However, an image to be scaled is not limited to this, and the normalized image of detected face image data may be scaled.

The above embodiments have described, as a layout output, an output in which a plurality of images are arranged on one page. However, the present invention is also applicable to output of a plurality of pages.

In the above-described embodiments, even image data not registered in the dictionary is classified into a group in person group generation processing, but may not be classified.

Although the above-described embodiments have exemplified a person's face as an object, the object is not limited to a person's face. A pet's face can be set as an object by performing recognition processing for a pet such as a dog or cat to recognize it. Since even a building, small item, or the like can be recognized by recognizing a shape by edge detection or the like, it can also be set as an object. In these cases, image processing can be performed by the same method as those in the above-described embodiments by extracting the feature amounts of an object and registering them in the dictionary.

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154013, filed Jul. 9, 2012, which is hereby incorporated by reference herein in its entirety.

What is claimed is:

1. An apparatus comprising:
   at least one processor operatively coupled to a memory, serving as:
   a determination unit configured to determine, on the basis of whether a degree of blurring of the object image satisfies a predetermined reference, whether image quality of an object image in image data is an image quality suitable for object recognition;
   an extraction unit configured to extract feature amount of the object image; and
   a registration unit configured to register, in a dictionary being referred to for the object recognition, the feature amount of the object image extracted by the extraction unit,
   wherein the registration unit does not register the feature amount of the object image in the dictionary if the determination unit determines that the image quality of the object image is not the image quality suitable for the object recognition, and the registration unit registers the feature amount of the object image in the dictionary if the determination unit determines that the image quality of the object image is the image quality suitable for the object recognition.

2. The apparatus according to claim 1, wherein if the determination unit determines that the image quality of the object image is not the image quality suitable for the object recognition, extraction of the object image by the extraction unit is not performed.

3. The apparatus according to claim 1, further comprising a management unit configured to manage the object image in a group in which a similarity between the feature amount of the object image and another feature amount falls within a predetermined similarity range,
   Wherein the management unit manages, in the group, the object image in the image data regardless of a result of the determination by the determination unit.

4. The apparatus according to claim 1, wherein the determination unit determines whether the image quality of the object image is the image quality suitable for the object recognition based on whether a difference between the image data and a blurred image obtained by blurring the image data is smaller than a predetermined reference value.

5. The apparatus according to claim 1, wherein the determination unit determines whether the image quality of the object image is the image quality suitable for the object recognition by determining whether the object image blurs based on high frequency components of the object image.

6. The apparatus according to claim 1, further comprising a matching unit configured to perform the object recognition based on feature amount of image data and feature amount of image data registered in the dictionary.

7. The apparatus according to claim 1, further comprising:
   an input unit configured to input image data; and
   a detection unit configured to detect the object image based on the image data input by the input unit,
   wherein the extraction unit extracts the feature amount of the object image detected by the detection unit.

8. The apparatus according to claim 7, wherein the determination unit determines whether the image quality of the object image is the image quality suitable for the object recognition by using image data higher in resolution than image data used for detection by the detection unit.

9. The apparatus according to claim 7, further comprising a resize unit configured to resize the image data input by the input unit to generate a first image data having lower resolution than that of the input image data,
   wherein the detection unit detects the object image based on the first image data.

10. The apparatus according to claim 9, further comprising a generation unit configured to generate a second image data having a higher resolution than that of the first image data,
    Wherein the determination unit determines whether the image quality of the object image in the second image data is the image quality suitable for the object recognition.

11. The apparatus according to claim 1, wherein the determination unit determines the image quality of the object image is not the image quality suitable for the object recognition if the object image blurs.

12. The apparatus according to claim 1, further comprising a display control unit configured to control a display unit to display the object image,
    wherein if the determination unit determines the image quality of the object image is not the image quality being suitable for object recognition, the registration unit does not register the feature amount of the object image in the dictionary and the display control unit controls the display unit to display the object image.

13. A method executed by a processor of an apparatus, the method comprising:
    determining whether image quality of an object image in image data is an image quality suitable for object recognition, on the basis of whether a degree of blurring of the object image satisfies a predetermined reference;
    extracting feature amount from the object image; and
    registering, in a dictionary being referred to for the object recognition, the extracted feature amount of the object image,
    wherein, in the registering, the feature amount of the object image is not registered in the dictionary if it is determined in the determining that the image quality of the object image is not the image quality suitable for the object recognition, and in the registering, the feature amount of the object image is registered in the dictionary if it is determined in the determining that the image quality of the object image is the image quality suitable for the object recognition.

14. A non-transitory computer-readable storage medium storing a program for causing a computer to perform:
    determining whether image quality of an object image in image data is an image quality suitable for object recognition, on the basis of whether a degree of blurring of the object image satisfies a predetermined reference;
    extracting feature amount of the object image; and
    registering, in a dictionary being referred to for the object recognition, the extracted feature amount of the object image,
    wherein in the registering, the feature amount of the object image is not registered in the dictionary if it is determined in the determining that the image quality of the object image is not the image quality suitable for the object recognition, and in the registering, the feature amount of the object image is registered in the dictionary if it is determined in the determining that the image quality of the object image is the image quality suitable for the object recognition.

15. The non-transitory computer readable storage medium according to claim 14, wherein if it is determined in the determining that the image quality of the object image is not the image quality suitable for the object recognition, extraction of the object image in the extracting is not performed.

16. The non-transitory computer readable storage medium according to claim 14, further comprising managing the object image in a group in which a similarity between the feature amount of the object image and another feature amount falls within a predetermined similarity range,
wherein in the managing, in the group, the object image in the image data is managed regardless of a result of determination in the determining.

17. The non-transitory computer readable storage medium according to claim 14, further comprising performing the object recognition based on feature amount of image data and feature amount of image data registered in the dictionary.

18. The non-transitory computer readable storage medium according to claim 14, wherein the image quality of the object image is determined as the image quality not being suitable for object recognition if the object image blurs.

* * * * *